United States Patent [19]

Spilo

[11] Patent Number: 5,459,869
[45] Date of Patent: Oct. 17, 1995

[54] METHOD FOR PROVIDING PROTECTED MODE SERVICES FOR DEVICE DRIVERS AND OTHER RESIDENT SOFTWARE

[76] Inventor: Michael L. Spilo, 248 E. 31st St., New York, N.Y. 10016

[21] Appl. No.: 197,860

[22] Filed: Feb. 17, 1994

[51] Int. Cl.$^6$ .................................. G06F 9/38; G06F 9/46
[52] U.S. Cl. .................. 395/700; 395/375; 364/280; 364/DIG. 1
[58] Field of Search .................................. 395/700, 375; 364/DIG. 1, 280

[56] References Cited

U.S. PATENT DOCUMENTS

| | | | |
|---|---|---|---|
| 4,747,040 | 5/1988 | Blanset et al. | 364/200 |
| 4,825,358 | 4/1989 | Letwin | 364/200 |
| 4,926,322 | 5/1990 | Stimac et al. | 364/200 |
| 4,974,159 | 11/1990 | Hargrove et al. | 364/200 |
| 5,027,273 | 6/1991 | Letwin | 364/200 |
| 5,193,161 | 3/1993 | Bealkowaski et al. | 395/400 |
| 5,255,379 | 10/1993 | Melo | 395/400 |
| 5,303,378 | 4/1994 | Cohen | 395/700 |

*Primary Examiner*—Kevin A. Kriess
*Assistant Examiner*—A. Katbab
*Attorney, Agent, or Firm*—Schweitzer Cornman & Gross

[57] ABSTRACT

A method and system for allowing protected mode device drivers and resident programs to load and execute from an MS/PC-DOS environment. A further method enabling such protected mode programs in an Intel x86 environment to transition between host environments is provided. In a preferred embodiment, a method for allowing for protected mode programs running in a DOS environment which can then transition and continue to function in a Windows environment. An improved method of mode switching for such drivers is also provided.

4 Claims, 5 Drawing Sheets

METHOD FOR PROVIDING PROTECTED MODE SERVICES FOR DEVICE DRIVERS AND OTHER RESIDENT SOFTWARE

TECHNICAL FIELD

This invention relates to personal computer systems. More particularly, the present invention relates to personal computers utilizing Intel architecture operating in a mixed mode environment.

BACKGROUND ART

Because of the peculiar evolution of Intel architecture personal computers, there has been a continuous need for the operating system to support what is now known as a "Real Mode" environment. The first 8088 series microprocessors were designed to utilize operating or random memory of up to 1024 Kilobytes. While this constraint was not originally seen as a significant limitation, subsequent increases in computing power of subsequent generation processors have increased the need for greater memory. Since the development of the 8088 architecture, a variety of methods have evolved to provide access to such extra memory. With the advent of the 286 series microprocessor, "protected mode" became available as part of the central processing unit (CPU)'s architecture, and a method for switching back and forth between real and protected modes was provided in the basic input/output system (BIOS) provided with the system. Vendors used this mode switching capability to create "DOS Extender" programs that allowed an application to run in protected mode and then switched back to real mode to perform system related operations such as I/O and file management. When operating in the Protected Mode, a series 286 processor was able to increase the amount of memory available to 16 megabytes. Such additional memory was called extended memory.

The advent of the 386 series microprocessor architecture with paging capabilities and "Virtual 8086" (V86) Mode, saw the advent of "memory management" programs that provided the paging capability to real mode programs. These programs, part of a class called V86 Mode Monitors or Virtual Mode Monitors (VMMs), operate the system in protected mode and provide certain services to one or more V86 mode environments. These services typically consist of memory management services, but VMMs exist for multi-tasking (Microfsoft's Windows), providing debugging capabilities (Nu-Mega Technologies' Soft-ICE) and various other uses.

Since Intel architecture provides for only a single protected mode environment or VMM to be active at any one time, the VMMs and DOS Extenders were thus unable to co-exist, and a group of vendors of the two technologies united and provided the Virtual Control Program Interface (VCPI). This Application Program Interface (hereinafter "API") provides DOS Extenders the ability to switch the protected mode environment to and from the VMMs, allowing the DOS extenders to function much as they did in the 286, BIOS switched environment, but with the VMM switching in and out of the DOS Extender's environment rather than the BIOS.

The pressure on the real mode address space was not fully relieved, however. Neither the paging capability provided by memory manager VMMs, nor the application relief provided by DOS Extenders, was sufficient to meet users needs for real mode address space, and in late 1989 Helix Software Company of New York developed Netroom, a product that used the paging capability of the 386 to multi-task certain layers of the operating system in a manner similar to overlay technology found in more sophisticated operating environments, such as expounded in U.S. Pat. No. 3,618,045 to Campbell. In July of 1991 Quarterdeck Office Systems of California used a similar technology to overlay the BIOS with Real Mode addressable RAM. These techniques are limited in that by using paging and overlay techniques they can place a substantial drain on performance. They also limit the address space of the drivers and other resident software that they manage to the size of the overlay region which, of course, is at most, limited to the 1 Mb V86 address space, and in practice is substantially smaller.

With the advent of Microsoft Windows, Microsoft needed a method that would allow DOS Extenders to coexist with Windows, and thus developed the DOS Protected Mode Interface (DPMI), Intel Corporation document 240977-001, which is actually the API for the DOS Extender that is built into Microsoft Windows. Thus, existing DOS Extender programs could perform simple translations on behalf of the applications, allowing them to operate in a Windows controlled environment.

DOS Extender companies have also provided Protected Mode capabilities to operating system level software such as device drivers and resident software (collectively "drivers"). This technology has the advantage of not limiting the address space of the drivers. However, DOS Extender methodology has significant drawbacks when used in a driver environment. First, each driver must have its own DOS Extender, creating multiple environments that must be supported. Second, since DOS Extenders run in their own protected mode environment, several useful capabilities such as having universal and immediate access to interrupts, are not available. In addition, DOS Extender technology is based upon switching from one protected mode environment to another. This switching has inherent CPU overhead which makes it substantially slower than desired for operating system level software that may be required to respond very quickly, in "real time".

U.S. Pat. No. 4,974,159 to Hargrove, et al. describes a method for transferring control to protected mode from Virtual 8086 mode using a faulting mechanism. This method is convenient in that it requires only one byte of code in the V86 instruction space, and can be used to transfer control to a dispatcher that can then call protected mode routines, simulate some V86 function or return from a call to a V86 routine. However, this mechanism has several drawbacks when considered for use in an environment in which drivers or resident software is running in protected mode. First, the faulting mechanism involved is slow, requiring a CPU fault (error condition) to switch modes. Second, the processing of the fault is inherently slow because the instruction causing the fault must be examined to determine the cause of the fault. Also, the mechanism for dispatching from the fault handler requires data structures which associate a particular fault location with a particular protected mode routine. This causes either a fixed limit to the number of such faults that can be handled (as is the case in Microsoft Windows), or requires a complex allocation scheme to allow for the dynamic creation of such structures.

Finally, in order for any protected mode drivers to be truly useful they must be able to operate with Microsoft's Windows (hereinafter simply "Windows") and other multi-mode operating environments. The obvious approach to this problem, which has been taken by DOS Extender vendors, is to maintain a separate environment as they do in the DOS Extender/VMM arena, and since Windows does not contain a VCPI-like interface of its own when Windows starts up its environment, write a Windows device driver that transfers control over from the Windows Global Descriptor Table (GDT) and Interrupt Descriptor Table (IDT) to the protected mode GDT/IDT that the DOS-Extended software operates on, much like VCPI provides.

This approach is similar to VCPI and has many of the same drawbacks as VCPI itself, namely, it is slow, does not allow for some particularly useful capabilities as discussed earlier, and is difficult to implement. It has the additional drawback in a Windows environment of conflicting with Window's internal faulting mechanism, requiring several VCPI-like switches for each event causing a fault.

SUMMARY OF THE INVENTION

It is the object of the present invention to provide an improved system and method for providing protected mode capabilities for drivers.

It is a further object of the present invention to provide complete access to all capabilities of protected mode operation to protected mode drivers.

It is a further object of the present invention to provide a mode switching technology that is optimized for drivers and resident software to provide maximum throughput capabilities.

It is a further object of the present invention to provide a method whereby all protected mode capabilities can be available in a multiplicity of environments and, in particular are available in a Microsoft Windows environment.

These and other objectives, which will become apparent as the invention is described in greater detail are obtained by providing an improved method and system for managing protected mode in an Intel architecture environment.

DETAILED DESCRIPTION OF THE INVENTION

Figure 1:
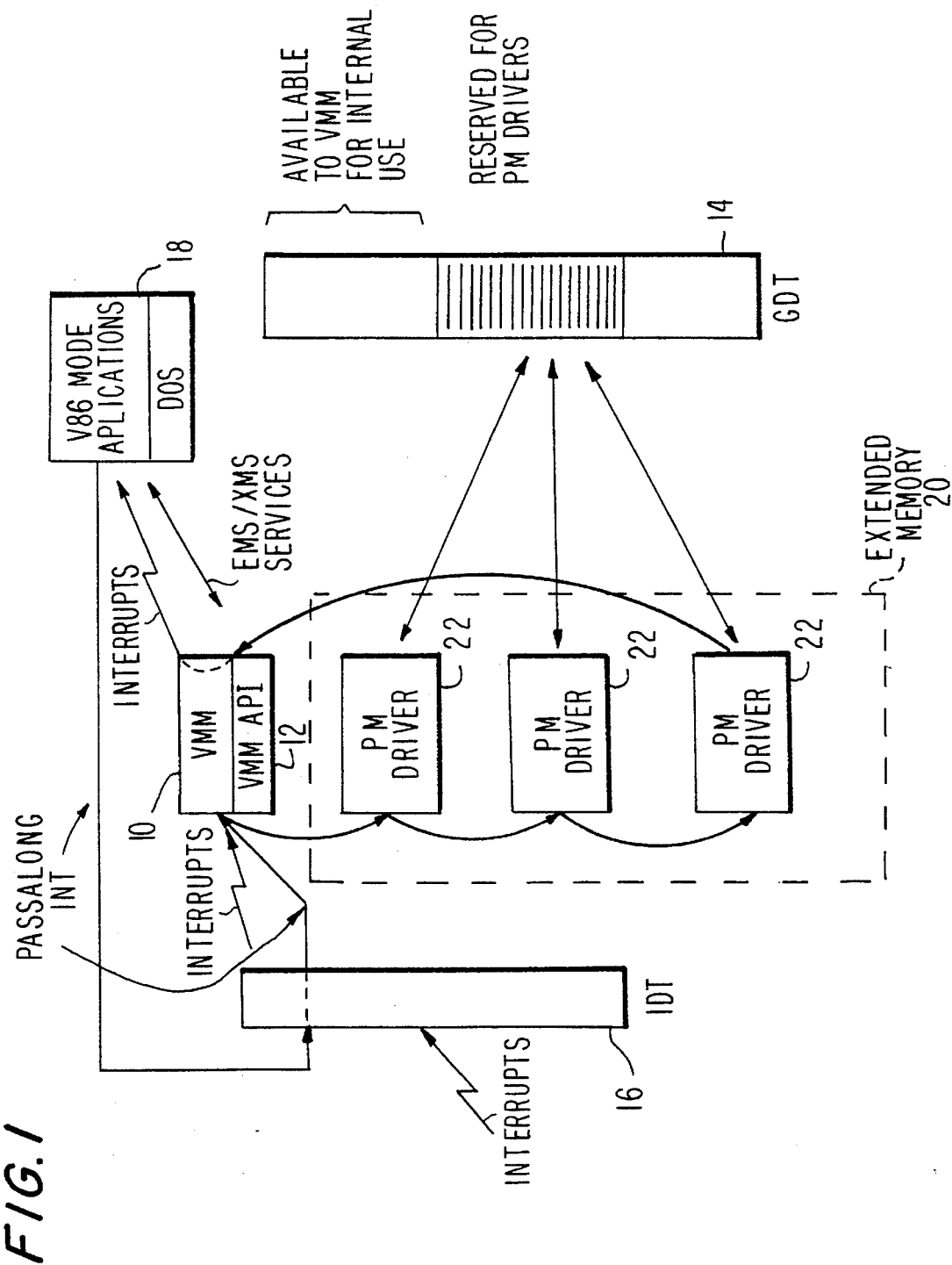
FIG. 1 is a representation of the relationship between the various elements of an operating environment of the present invention.

In a preferred embodiment, the present invention is used in place of the basic low-level software that provides the protected mode environment of the operating system, the VMM. The implementing software must be in itself a full featured VMM 10 that provides the basic protected mode service provided by standard memory management software, including available extended and expanded memory (EMS, XMS), and VCPI services. However, a preferred embodiment must also provide a built-in interface 12 that contains and provides to other programs the following capabilities as shown in FIG. 1:

a. Detection of the presence of the capabilities;

b. Allocation and de-allocation of selectors from the GDT 14;

c. Setting of various selector parameters, such as base and limit;

d. Trapping or hooking of the IDT 16;

e. Obtaining and setting the passalong address;

f. Switching of V86 mode code to protected mode code at initialization. This function allows a protected mode program to run on the same GDT and IDT as the memory manager. More specifically, a program 18 running in V86 mode must be allowed to allocate memory outside the V86 mode address range (extended or XMS memory 20), and to load this memory with program code. The XMS interface is ideally suited for this, allowing extended memory to be allocated and loaded. However, the VMM must then be capable of allocating selectors on its own GDT and providing an interface which allows a V86 mode program to start up the protected mode code that was loaded into the extended memory. The present invention automatically creates, or allows the creation of, selectors that can address the extended memory, and transfers control to some known or specified location within said memory;

g. Return of the protected mode program to the V86 mode to allow DOS programs to continue to operate. In a preferred embodiment, after initialization, the program should return directly to the V86 mode code that initiated the protected mode execution.

h. Switching to and controlling the protected mode program at run-time.

The memory manager must also have the following specific characteristics:

The ability to operate with protected mode interrupts resulting from any protection level and any selector. More specifically, the VMM should behave as follows when processing an interrupt: If the interrupt occurred from protected mode it should be immediately reflected or passed to V86 mode. If the interrupt occurred in V86 mode it should be examined for possible use by the VMM, and if no use is found, it should be reflected directly back.

Figure 3:
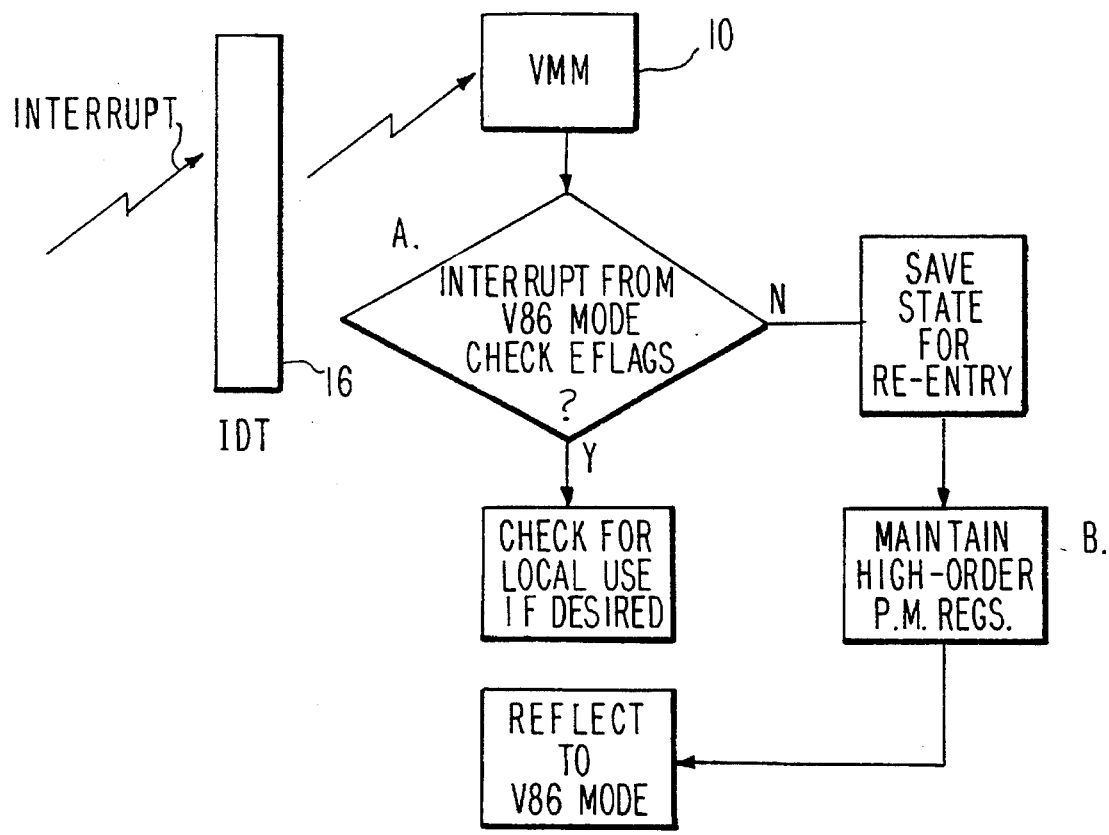
FIG. 3 is a flowchart depicting interrupt processing by the present invention.

In order to accomplish this, the VMM must not depend on the stack pointer pointing at a particular location upon entry to the VMM from an interrupt event. Accordingly, the present invention provides for a reference back to the EFLAGs register located on the stack at interrupt time to determine whether the interrupt occurred in V86 mode or protected mode as shown in FIG. 3. In particular, when reflecting the interrupt from protected mode, the VMM must be designed in such a way that it can either save its own internal state and return to the saved state smoothly, or to be designed so that it is completely re-entrant.

Furthermore, the handling of interrupts must specifically be designed so as to protect high order registers of protected mode code. Specifically, when reflecting interrupts to V86 mode, the VMM should not allow changes made to the high-order (top 16 bits) of the 32 bit registers to be changed by the V86 mode code. It has been found that several V86 mode programs feel free to destroy the contents of the high order registers during interrupt handling, and this can interfere with the execution of protected mode software. The routine set forth in FIG. 3 maintains such registers at 22 and eliminates this problem.

The memory manager must also allow protected mode programs to manipulate the registers of the V86 mode execution stream. This can be accomplished by saving the registers in an area accessible to protected mode drivers, and providing that any change to this area shall be passed to V86 mode 26. This is illustrated in FIG. 4, which routine is entered after an interrupt is processed in accordance with the routine of FIG. 3.

In addition, the ability to allocate selectors from an indeterminate, user settable starting point, generally somewhere roughly the middle of the range of valid selector values, should be provided. This ability should also provide for allocating selectors in a top-down fashion if needed. This complicates implementation substantially, but is particularly important as it facilitates the transfer into other environments.

This particular combination of capabilities and characteristics provides particular benefits which enhance the operation of drivers in a way not possible with, for instance, DOS Extender style protected mode device driver capabilities which use VCPI. It also makes possible the transitioning of the drivers in a Microsoft Windows-like multi-mode operating environment as discussed below.

This particular combination allows for the following sequence to commence upon the loading of drivers, allowing the drivers to run on in the same protected mode environment as the VMM.

Figure 2:
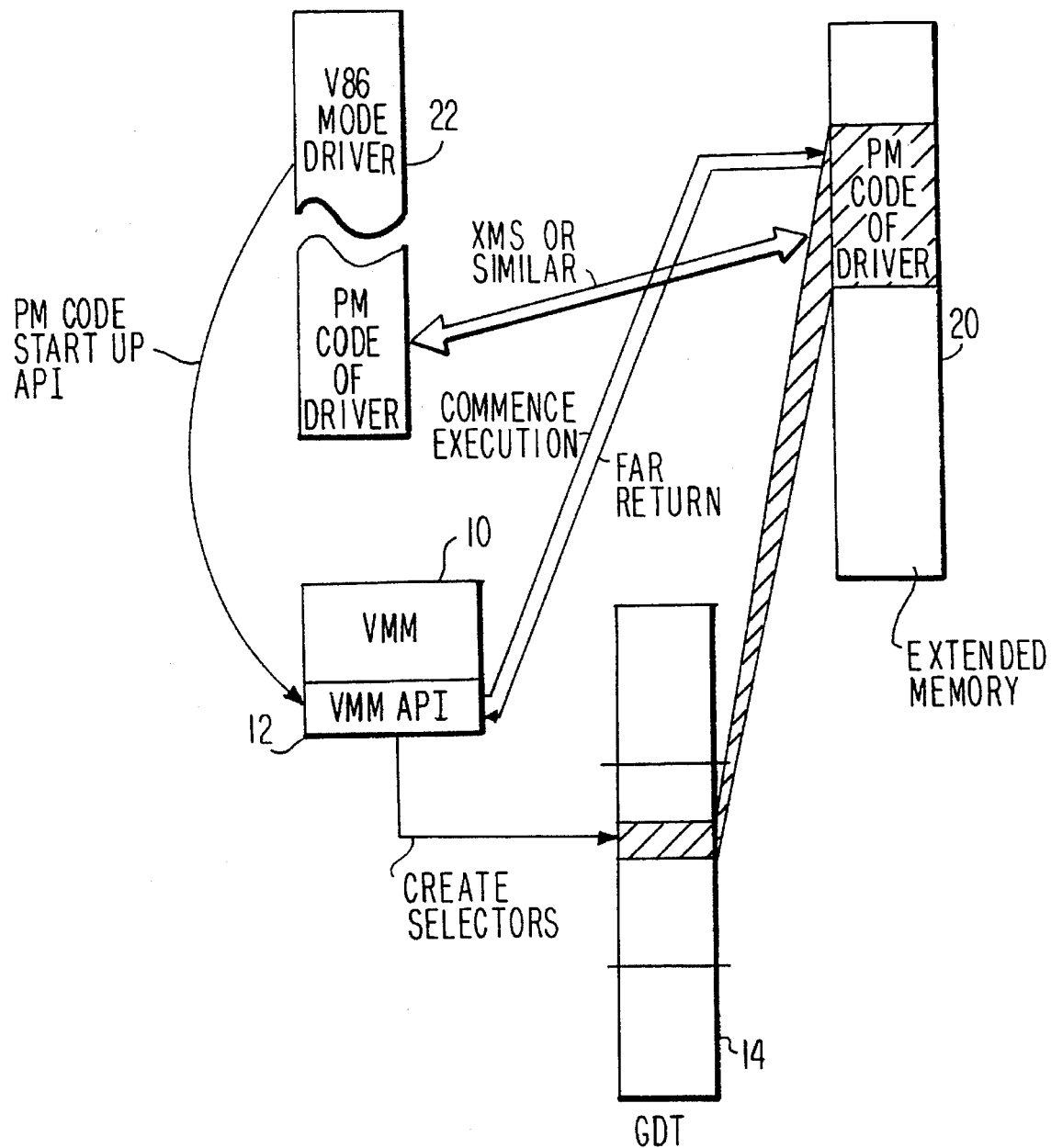
FIG. 2 is a representation of the start-up of a driver in accordance with the present invention.

According to an aspect of the invention as presented in FIG. 2, drivers 22 proceed by detecting the presence of the VMMs 10 implemented in the fashion according to the invention. Then, the drivers allocate memory outside the usual V86 address range using the function defined in (e) above. The protected mode code then initializes its own operation, performing as needed. When the initialization is complete, the code transfers control back to the V86 code that launched it, preferably by simply issuing a Far Return instruction.

Figure 4A:
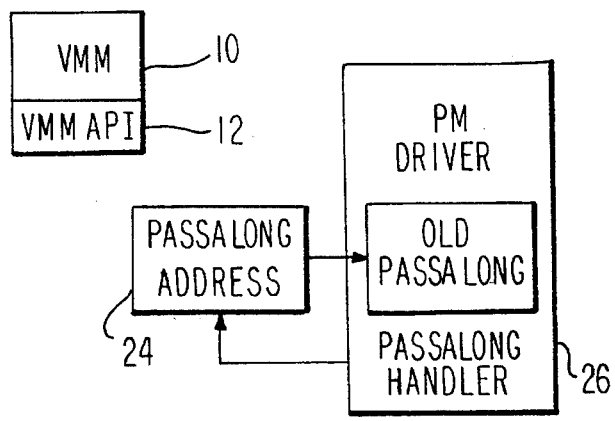
FIGS. 4A and 4B are flowcharts depicting the development of a passalong address and the processing of such address during control transfer.

As shown in FIG. 4A, during initialization the protected mode code can issue a call to the VMM to get the current value of a pointer, called the passalong address 24. This value is stored by the protected mode program which then uses another call to set this address. The new value is a pointer to a routine within the protected mode code called a passalong handler 26.

Figure 4B:
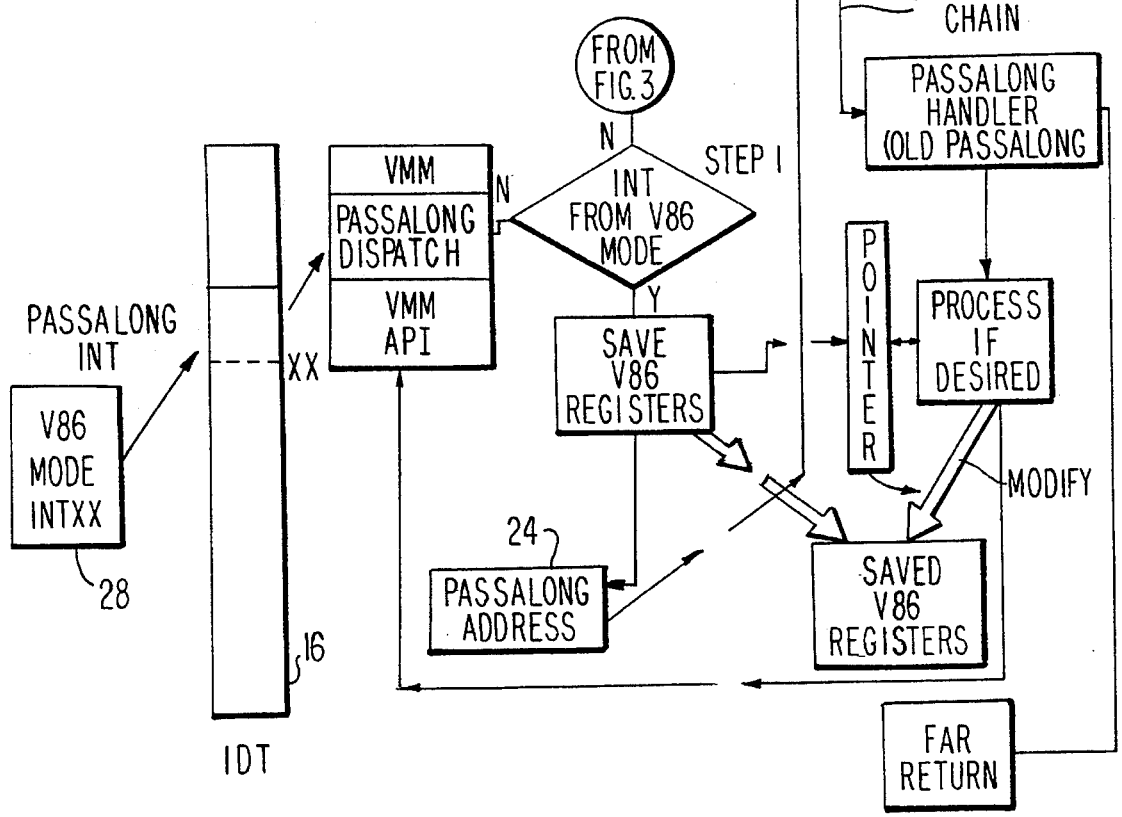

Following initialization control transfer issues become critical and timing sensitive. To provide for optimal switching speed a preferred embodiment of the present invention uses one of the Intel Architecture's INT xx instructions 28 to transfer control to protected mode from V86 mode. This instruction causes the processor to transfer control to an instruction whose address is specified in the IDT 16. This should point at a routine in the VMM that does only two things, as shown in FIG. 4B. In step (1), the interrupt is distinguished as coming from V86 mode. If it is, then the VMM simply issues a PUSHAD instruction or an equivalent sequence to set up a memory address that contains all the V86 mode registers. The VMM then loads the stack pointer into one of the general registers and issues a Far Call to the passalong address.

The passalong address is set up such that it initially points at a Far Return instruction. When a protected mode program gets and sets the address to its own routine, it effectively inserts itself into a chain of program routines that are called whenever the INT instruction to transfer control to protected mode executes. Each of the routines can examine the V86 mode registers to determine where the INT instruction was issued or to find some value that has a particular meaning to the protected mode code. If the particular instruction occurred at an address known on a pre-defined basis by the protected mode code (such as if it occurred within the V86 mode code that launched it), or in any event if the protected mode passalong handler decides that it needs to on any basis, the passalong routine can perform some function it desires. If the INT instruction is of no meaning or use to the passalong it simply issues a jump to the address it got of the previous passalong handler or the original Return instruction.

This effectively creates a jump chain of protected mode programs with each examining a value and jumping to the next, ending in a return. If all have finished processing the VMM reflects the interrupt, otherwise the passalong handler handling the call signals that the interrupt has been handled and returns, as presented in FIG. 4B.

Contrary to what may seem to be a slower approach than in Hargrove, this is actually far faster. The speed is achieved in the minimizing of the instructions needed to get to the first entry on the passalong chain, and by defining the chain as a simple check-and-jump series. Also in newer implementations of the Intel architecture, such as those found on the I486 and Pentium family, the mode switch caused by an INT instruction is optimized over the faulting mechanism and achieves further gains.

The INT instruction is also inherently distinguishable as one of a family of 255 INT xx instructions, and thus several such passalong chains can be established, each with direct, CPU-controlled access. Lastly, this approach is not limited in that there is no address table needed, and each passalong handler has its own effective and internal dispatch table and is thus limited only by available memory.

Figure 5:
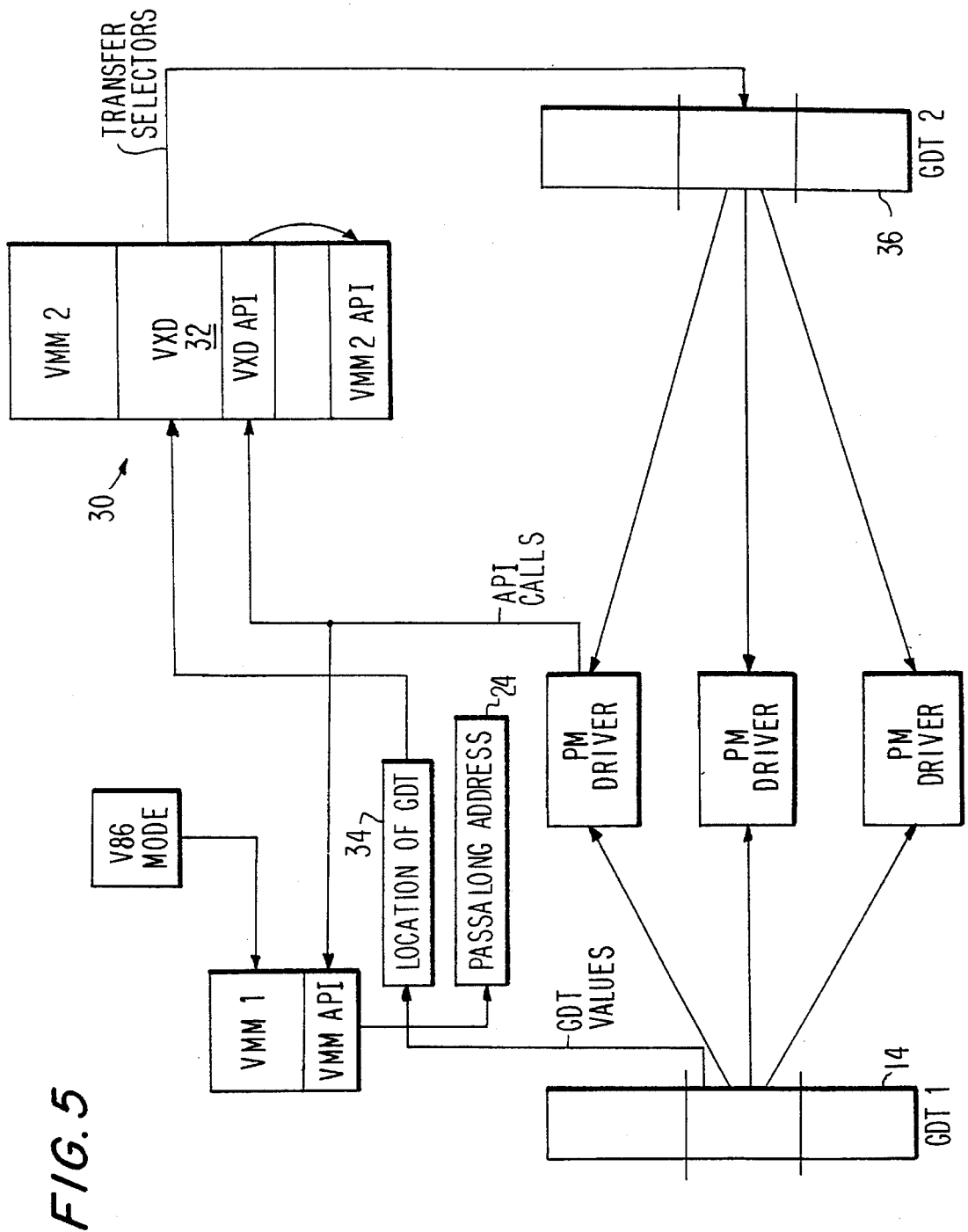
FIG. 5 is a representation of the control transfer methodology in a Windows or other similar environment.

Once the above is set up it is possible to transfer control, and maintain operational functionality in other protected mode environments using the following method, as shown in FIG. 5: A device driver native to the other protected mode environment 30, which is Microsoft Windows in a preferred embodiment (we will refer to Windows although the procedure applies to other environments such as OS/2), must be written to comply with the environment's known specification. This Windows device driver or VXD 32 must, upon start up, be able to identify the location 34 in physical memory of the VMMs GDT, and of the passalong address 24. This is accomplished by establishing a protocol in which these physical addresses are stored in a known location, or passed directly to the VXD at startup.

The VXD then reserves selectors on the Windows GDT 36 to match those on the VMM GDT 14 that contain the protected mode device driver selectors, those allocated in the middle of the GDT or in a top-down fashion. This is accomplished by allocating GDT selectors using known methods (see, e.g., Microsoft document number PC29133-0592) until the selector region used by the VMM is reached. The allocation of selectors continues until all selectors previously available through the VMM have been allocated. The Windows device driver (VXD) then releases selectors not in the VMM's allocatable range back to Windows. Note that the selectors were specifically defined as starting in the middle of the GDT to facilitate this, and that the starting point for selectors in the VMM may need to vary from one environment to another.

Once the selectors have been reserved, the active selectors from the VMM environment have their base limit and kind copies to the corresponding entry on the Windows GDT. This is accomplished by the VXD reading the values directly from the VMM's GDT, the address of which is known as defined above. The VXD then copies values read from the VMM GDT for each selector's base, limit and type into Windows' GDT, translating the base value as needed and using the Windows API.

The VXD must then establish itself in a position to provide the same API as the VMM by trapping the appropriate entry points. This is accomplished by having the entry point accessible through one of the "global" selectors copied from the VMM, or by providing an API which is interrupt based, in which case the VXD must trap the corresponding interrupt in Windows during the Windows start-up. In the preferred embodiment, both methods are used for the convenience of driver developers. Once so established, the VXD can either perform, in the new VMM environment, the equivalent functions as available in the old environment, or translate the function into the equivalent function as available in the new environment.

The VXD must further establish itself to trap, within Windows, the INT/passalong mode switches defined previously. This is accomplished either by hooking the Windows IDT, or by hooking the Windows internal interrupt dispatcher using known techniques. As part of this process, the VXD must provide a passalong dispatcher that operates in a manner similar to the dispatcher described for the VMM. In the preferred embodiment the VXD hooks the Windows internal interrupt dispatcher, allowing Windows to operate in a more normal fashion.

Finally, the VXD must issue a broadcast along the passalong chain, the handlers of which are now active (because their selectors are pre-defined). This broadcast must be distinguishable as unique by all programs with handlers on the passalong chain, and can be accomplished by providing an invalid or unique set of values in the client register set. The passalong handlers can then modify their own behavior to suit the new environment and establish any Windows specific operations.

Once this is done, the drivers can continue to operate as before, but with Windows providing the primary VMM services.

Routines by which the present invention can be implemented are annexed hereto and presented in the following program listings.

```
         EXAMPLE OF PASSALONG HANDLER extrn    pm_api_entry:near int_2C_handler:
         push     ax
         mov      ax,ss                              ;check for 16 bit stack
         cmp      ax,cs:[pmode_data_selector]
         pop      ax
         jne      @f movzx    esp,sp
@@:      test     byte ptr ss:[esp+10],2             ;test VM bit
         db       66h,68h                            ;PUSH DWORD PTR
         dd       (2Ch*8)+3
         jz       pm_api_entry
         cmp      word ptr ss:v86_cs,1234h           ;Check for local use
         org      $-2
v86_chk_2C_value:
         dw       0
         je       fast_path_chk                      ;yes, local use
         pushad                                      ;save regs
         mov      ebx,esp
         mov      eax,dword ptr cs:[v86_eip+2]       ;load eax for convenience
         mov      ax,word ptr cs:[v86_eip]
         clc                                         ;flags indicate if to reflect
         call     fword ptr cs:[passalong_offset]

popad
         jnc      general_int_handler add      sp,4                               ;step past error code
         and      byte ptr ss:v86_eflags+1,NOT 01h   ;clear TF flag
         iretd                                       ;return to V8086 mode note: passalong initially points at 32 bit RETF
```

EXAMPLE OF HOW VMM API SERVICES ARE PROVIDED UNDER WINDOWS

```
;------------------------------------------------------------------------
;------------------------------------------------------------------------ api_dispatch_table label dword
        dd      offset32 alloc_GDT_selector     ;0
        dd      offset32 free_GDT_selector      ;1
        dd      offset32 set_selector_base      ;2
        dd      offset32 set_selector_limit     ;3
        dd      offset32 set_selector_access    ;4
        dd      offset32 set_selector_mode      ;5
        dd      offset32 get_IDT_entry          ;6
        dd      offset32 set_IDT_entry          ;7
        dd      offset32 get_passalong          ;8
        dd      offset32 set_passalong          ;9
        dd      offset32 get_selector_base      ;a
        dd      offset32 get_selector_limit     ;b dd      offset32 call_v86_int           ;26h MAX_PM_API_FUN EQU ($-api_dispatch_table)/2

BeginProc VxD_int_2c_handler
        test    byte ptr [esp+10],2             ;v86 mode? (-4 no error)
        je      PM_int_2c
        jmp     cs:[oldi2c]

;------------------------------------------------------------------------
;P.M. api interface dispatch routine
;
;       Entry:  EAX = function number
;               other regs as needed
;
;       Exit:   if no carry
;                       completed ok
;               if carry
;                       AX = api error number
;
;       API function number list
;               0       allocate GDT selector
;               1       free GDT selector
;               2       set GDT selector base
;               3       set GDT selector limit
;               4       set GDT selector access rights
;               5       set GDT selector granularity/data mode bits
;               6       get IDT entry (0 to 7F)
;               7       set IDT entry (0 to 7F)
;               8       get PM passalong address
;               9       set PM passalong address
;               A       get GDT selector base
;               B       get GDT selector limit
;               C       SET SELECTOR TO RING 3 UNDER WINDOWS
;               D       TRANSITION TO RING 3
;               E       return address of BIOS int callback
;
;
```

```
;       error codes
;               1 -- out of selectors
;               2 -- Invalid selector
;               3 -- Selector not user selector
;               4 -- Selector not allocated
;               5 -- Invalid function number
;
;-----------------------------------------------------------------------
PM_int_2c:
api_call_entry:
        movzx   eax,ax                          ;clear high order
        cmp     eax,MAX_PM_API_FUN              ;past end
        ja      short invalid_function_error
        call    cs:api_dispatch_table[eax*4]
        ;clc
        retf    4                               ;toss flags invalid_function_error:
        cmp     eax,0f0h                        ;mouse func call?
        jae     short check_mouse_function return_invalid_function:
        mov     ax,5                            ;invalid function
        stc
        retf    4 check_mouse_function:
        cmp     eax,0f1h
        ja      short return_invalid_function
        sub     eax,0f0h
        call    cs:mouse_func_table[eax*4]
        retf    4
EndProc VxD_int_2c_handler ;-----------------------------------------------------------------------
;Pass along handler -- pass V86 mode int 2c calls through PM pass-along list
;
;       ENTRY:
;               EBX = VM ID
;               EBP = Client register structure
;               EAX = int number
;
;       Exit:   if no pass_alongs or pass alongs return cy clear
;                       then return cy set to windows to pass int 2c to next
;
;               if pass along returns with carry set return with carry clear
;                       to windows
;
;-----------------------------------------------------------------------
BeginProc Pass_along_handler
        cmp     word ptr cs:[pass_along+4],0    ;no pass along?
        je      short no_pass_along pushad
        push    ds
        push    es
        push    fs
        push    gs xchg    ebx,ebp
```

```
            movzx    eax,ss:[ebx].Client_cs
            shl      eax,16
            mov      ax,word ptr ss:[ebx].Client_EIP
            pushfd
            CLI
            call     cs:[pass_along]
            pop      eax
            pushfd
            test     ah,2
            je       @f
            or       word ptr ss:[esp],200h
@@:         popfd
            pop      gs
            pop      fs
            pop      es
            pop      ds
            popad cmc
            jc       short no_pass_along ret no_pass_along:
            stc
            ret
EndProc Pass_along_handler ;-------------------------------------------------------------------------------
;
;       Entry:   EBX = selector base
;                EDX = selector limit
;                CL  = selector access
;                CH  = selector mode
;
;
;       Exit:    if no carry
;                     AX = selector to use
;                if carry
;                     AX = 1 -- out of selectors
;
;-------------------------------------------------------------------------------
alloc_gdt_selector proc near
            push     ebx
            push     ecx
            push     edx
            push     esi
            push     edi
            push     es
            push     ds
            pushf
            cli
            mov      ax,word ptr cs:winds
            mov      es,ax
            mov      ds,ax
            mov      edi,offset32 selector_flags
            push     ecx
            mov      ecx,NUM_SELECTORS
```

```
            xor     al,al
            cld
            repne scasb
            pop     ecx
            jne     alloc_selector_error
            dec     edi
            mov     byte ptr ds:[edi],1
            sub     edi,offset32 selector_flags
            shl     edi,1
            mov     ax,[edi].selector_id
            clc
            sgdt    wingdt
            mov     esi,dword ptr ds:[wingdt+2]     ;get linear address of gdt
            movzx   edi,ax
            mov     ax,bx shr     ebx,16                          ;move high part low
            mov     word ptr ds:[esi+edi].segd_address,ax
            mov     byte ptr ds:[esi+edi].segd_address+2,bl
            mov     byte ptr ds:[esi+edi].segd_address_hi,bh mov     ds:[esi+edi].segd_access,cl mov     byte ptr ds:[esi+edi].segd_hilim,ch
            mov     word ptr ds:[esi+edi].segd_limit,DX
            shr     edx,16
            and     dl,0fh
            or      byte ptr ds:[esi+edi].segd_hilim,dl
            mov     ax,di
            popf
            clc
            pop     ds
            pop     es
            pop     edi
            pop     esi
            pop     edx
            pop     ecx
            pop     ebx
            ret alloc_selector_error:
            popf
            clc
            pop     ds
            pop     es
            pop     edi
            pop     edx
            pop     ecx
            pop     ebx
            mov     ax,1
            ret
alloc_gdt_selector endp ;--------------------------------------------------------------------------------
;Free GDT selector
;
;       Entry:  SI = selector
;
;       Exit:   if no carry
```

```
;                       completed ok
;               if carry
;                       AX = 2 -- Invalid selector
;                          = 3 -- Selector not user selector
;                          = 4 -- Selector not allocated
;
;-------------------------------------------------------------------------
free_GDT_selector proc near
        push    ecx
        push    esi
        push    edi
        push    es
        push    ds mov     ds,word ptr cs:winds
        mov     es,word ptr cs:winds
        mov     edi,offset32 selector_id
        mov     ecx,NUM_SELECTORS
        mov     ax,si
        and     al,0f8h
        cld
        repne scasw
        jne     free_selector_error
        sub     edi,offset32 selector_id+2
        shr     edi,1
        cmp     [edi].selector_flags,0
        je      free_selector_not_alloc
        mov     [edi].selector_flags,0
        xor     ax,ax free_selector_done:
        pop     ds
        pop     es
        pop     edi
        pop     esi
        pop     ecx
        ret free_selector_error:
        mov     ax,3
        stc
        jmp     short free_selector_done free_selector_not_alloc:
        mov     ax,4
        stc
        jmp     short free_selector_done
free_GDT_selector endp ;-------------------------------------------------------------------------
;invalid_fun -- invalid function - not supported under windows
;
;       Entry:
;
;       Exit:
;
;-------------------------------------------------------------------------
BeginProc invalid_fun
        stc
```

```
        ret
EndProc invalid_fun

;----------------------------------------------------------------------
;set selector base -- set linear selector base
;
;       entry:  si = selector
;               ebx = selector base
;
;       exit:   selector base modified
;
;       all others unmodified
;----------------------------------------------------------------------
BeginProc set_selector_base
        push    eax
        push    ebx
        push    ecx
        push    edx
        push    ds
        push    es
        mov     ax,word ptr cs:winds
        mov     ds,ax
        mov     es,ax
        movzx   eax,si
        VMMCall _GetDescriptor <eax, 0, 0>
        mov     ecx,edx
        or      ecx,eax
        jz      get_selector_error
        push    ax
        mov     ax,bx
        shl     eax,16
        pop     ax
        shr     ebx,16
        mov     dl,bl
        xor     bl,bl
        shl     ebx,16
        and     edx,not 0f0000000h
        or      edx,ebx movzx   ebx,si
        VMMCall _SetDescriptor <ebx, 0, edx, eax, 0>
        pop     es
        pop     ds
        pop     edx
        pop     ecx
        pop     ebx
        pop     eax
        clc
        ret set_selector_error:
        xor     ebx,ebx
        pop     es
        pop     ds
        pop     edx
        pop     ecx
        pop     ebx
        pop     eax
        stc
        ret
```

```
EndProc set_selector_base

;----------------------------------------------------------------
;get IDT entry -- return selctor:offset of an IDT vector
;
;       Entry:  CL = Int number
;
;       Exit:   DX:EBX current far call address
;
;----------------------------------------------------------------
BeginProc get_IDT_entry
        push    ecx
        push    ds
        push    es
        mov     ds,word ptr cs:winds movzx   ecx,cl
        shl     ecx,3
        add     ecx,dword ptr ds:[winidt+2]         ;get idt linear mov     ebx,dword ptr ds:[ecx+4]
        mov     ecx,dword ptr ds:[ecx]
        mov     bx,cx
        shr     ecx,16
        mov     dx,cx
        pop     es
        pop     ds
        pop     ecx
        ret
EndProc get_IDT_entry ;----------------------------------------------------------------
;set IDT entry -- set an IDT vector to selctor:offset
;
;       Entry:  CL = Int number
;
;       Exit:   DX:EBX current far call address
;
;----------------------------------------------------------------
BeginProc set_IDT_entry
        push    ecx
        push    edx
        push    ebx
        push    ds
        push    es
        mov     ds,word ptr cs:winds movzx   ecx,cl
        shl     ecx,3
        add     ecx,dword ptr ds:[winidt+2]         ;get idt linear shl     edx,16
        mov     dx,bx
        mov     bx,0ee00h
        mov     dword ptr ds:[ecx+4],ebx
        mov     dword ptr ds:[ecx],edx
        pop     es
        pop     ds
        pop     edx
        pop     ebx
```

```
            pop     ecx
            ret
EndProc set_IDT_entry

;-----------------------------------------------------------------------
;call v86 mode int -- call an interrupt routine running in v86 mode
;                     in the current VM
;
;       Entry:  ds:ebx = client register structure for v86 mode call
;               cx = interrupt number
;               note: uses v86 mode stack supplied in client structure
;
;       Exit:   cy set = no more nested procedure call space available
;-----------------------------------------------------------------------
BeginProc call_v86_int pushad
            push    ds
            push    es mov     dx,ds
            mov     esi,ebx mov     ax,word ptr cs:[winds]
            mov     ds,ax
            mov     es,ax VMMcall Get_Cur_VM_Handle
            mov     ebp,ds:[ebx.CB_Client_Pointer]

Push_Client_State
            VMMcall Begin_Nest_V86_Exec movzx   eax,cx cld
            push    ds
            push    esi
            mov     ds,dx
            mov     edi,ebp
            mov     ecx,8
            rep movsd
            add     esi,4*4
            add     edi,4*4
            mov     ecx,6
            rep movsd
            pop     edi
            pop     ds VMMcall Exec_Int cld
            push    es
            mov     es,dx
            mov     esi,ebp
            mov     ecx,8
            rep movsd
            add     esi,4*4
            add     edi,4*4
```

```
        mov     ecx,6
        rep movsd
        pop     es

VMMcall End_Nest_Exec
        Pop_Client_State pop     es
        pop     ds
        popad
        ret
EndProc call_v86_int
```

EXAMPLE OF PROTECTED MODE INTERRUPT HANDLER

WITH ABILITY TO REFLECT NESTED INTERRUPTS TO V86 MODE

```
;
; reflect ints 0-33 directly to real mode as fast as possible
;
        irp     z,<0,3,4,5,6,7,10,11,12,13,14,16,17,18,19,1A,1B,1C,1D,1E,1F, \
                20,    22,23,24,25,26,27,28,29,2A,2E,2F, \
                30,31,32,33,34,35,36,37,38,39,3A,3B,3C,3D,3E,3F> align   4                               ;force 4 byte boundary
        public  int_&z&_handler
int_&z&_handler:
        push    bx
        mov     bx,(0&z&h*4)
        jmp     reflect_int_instruction
        endm ;
;
; this code follows the int handlers so that it resides in the same page
; requiring less access to the page table
;
        align   4
reflect_int_instruction:
        push    ax                              ;save work regs
        mov     ax,ss
        cmp     ax,cs:[pmode_data_selector]
        jne     reflect_protected_int_entry
        movzx   esp,sp
        test    byte ptr ss:[esp+14],2
        jz      reflect_protected_int_entry
        push    edi                             ;edi
        movzx   edi,word ptr ss:v86_ss          ;edi = user ss value
        shl     edi,4                           ;into linear address
        mov     word ptr ss:v86_esp+2,0         ;zero out high order in case
        sub     word ptr ss:v86_esp,6           ;record new stack value
        jc      short reflect_int_inst_1        ;if wrap around skip
        add     edi,dword ptr ss:v86_esp        ;stack pointer to di
        mov     ds,ss:big_selector              ;point linear memory ; DS:DI => V86 mode stack pointer mov     ax,word ptr ss:v86_eflags       ;old flags value
        mov     word ptr ds:[edi+4],ax          ;store flags on user stack mov     ax,ss:v86_cs                    ;old cs value
        mov     word ptr ds:[edi+2],ax          ;store cs value on user stack mov     ax,word ptr ss:v86_eip          ;old ip value
        mov     word ptr ds:[edi],ax            ;store updated old ip value ; Calculate new v86 cs:ip
```

```
        mov     ax,word ptr ds:[bx]                     ;new ip value from real idt
        mov     word ptr ss:v86_eip,ax                  ;into v86 register stack
        mov     ax,word ptr ds:[bx+2]                   ;new ip value from real idt
        mov     ss:v86_cs,ax                            ;into v86 register stack pop     edi                                     ;restore entry stack
        pop     ax                                      ;ax
        pop     bx
        and     word ptr ss:v86_eflags+1,0fe7ch         ;clear TF+RF+IF+RF flags
        iretd                                           ;& return to v86 mode align   4
reflect_int_inst_1:
        mov     byte ptr ss:instruction_length,0 no_redirect_1:
        add     word ptr ss:v86_esp,6
        movzx   edi,word ptr ss:v86_ss                  ;edi = user ss value
        shl     edi,4                                   ;into linear address
        mov     dword ptr ss:user_data_seg+2,edi        ;store into descriptor
        mov     byte ptr ss:user_data_seg+5,92h         ;restore descriptor type
        mov     di,word ptr ss:v86_esp                  ;stack pointer to di
        sub     di,2                                    ;-2 for first item
        mov     ds,ss:user_data_selector                ;point DS at stack segment ; DS:DI => V86 mode stack pointer mov     ax,word ptr ss:v86_eflags               ;old flags value
        mov     ds:[di],ax                              ;store flags on user stack
        mov     ax,ss:v86_cs                            ;old cs value
        mov     ds:[di-2],ax                            ;store cs value on user stack
        mov     ax,word ptr ss:v86_eip                  ;old ip value
        add     ax,ss:instruction_length                ;step past instruction
        mov     word ptr ds:[di-4],ax                   ;store updated old ip value
        sub     di,4
        mov     word ptr ss:v86_esp,di                  ;record new stack value
        and     word ptr ss:v86_eflags+1,0fefch         ;clear TF+IF+RF flags ; Calculate new v86 cs:ip mov     ds,ss:real_data_selector                ;ds => linear zero
        mov     ax,word ptr ds:[bx]                     ;new ip value from real idt
        mov     word ptr ss:v86_eip,ax                  ;into v86 register stack
        mov     ax,word ptr ds:[bx+2]                   ;new ip value from real idt
        mov     ss:v86_cs,ax                            ;into v86 register stack pop     edi                                     ;restore entry stack
        pop     ax                                      ;ax
        pop     bx
        iretd                                           ;& return to v86 mode
;
reflect_protected_int_entry:
        pop     ax
        push    word ptr 0
        shl     bx,1                                    ;now its *8
        add     bx,3
        xchg    bx,word ptr ss:[esp]                    ;bx now has 0
        xchg    bx,word ptr ss:[esp+2]                  ;bx has old bx value
        jmp     protected_int_entry
```

```
        align   4
protected_int_entry:
        cld
        cli
        cmp     byte ptr cs:task_count,task_max
        jae     protected_int_skip
        PUSHAD
        push    gs
        push    fs
        push    ds                                      ;save ds
        push    es                                      ;save es
        pushad                                          ;save registers
        mov     ax,ss
        cmp     ax,cs:pmode_data_selector
        jne     save_whole_stack
        cmp     esp,offset pl0_stack_start
        jbe     protected_stack_overflow mov     ds,cs:[pmode_data_selector]             ;get ss
        bsf     eax,ds:[task_bittbl]                    ;search for available task
        jz      protected_int_skip
        btr     ds:[task_bittbl],eax                    ;clear task avail bit
        jnc     protected_int_skip
        mov     bx,ax                                   ;save task number
        mov     cx,task_length                          ;multiply by size of task
        mul     cx
        mov     di,ax
;
;stack is local so only need to copy used part
;
        mov     es,ds:[nesting_selector]                ;set es = save area
        mov     ax,sp
        add     ax,32                                   ;don't need to copy regs
        and     al,0fch                                 ;round down to dword boundry
        mov     word ptr es:[di].stack_move_start,ax
        mov     si,ax                                   ;where to start copying from
        sub     ax,offset pl0_stack_start               ;distance to top of stack
        mov     cx,pl0_stack_length
        sub     cx,ax                                   ;number of bytes to copy
        shr     cx,2                                    ;now number of dwords to copy
        mov     word ptr es:[di].stack_move_size,cx     ;save number of words
        mov     word ptr es:[di].stack_move_offset,ax   ;save starting offset
        add     di,size stack_move_struc
        add     di,ax                                   ;adjust size
        rep     movsd                                   ;save priv level 0 stack
        jmp     short join_after_stack_copy
;
;get here if stack is not local so need to save whole thing (no overflow check)
;
save_whole_stack:
        mov     ds,cs:[pmode_data_selector]             ;get ss
        bsf     eax,ds:[task_bittbl]                    ;search for available task
        jz      protected_int_skip
        btr     ds:[task_bittbl],eax                    ;clear task avail bit
        jnc     protected_int_skip
        mov     bx,ax                                   ;save task number
        mov     cx,task_length                          ;multiply by size of task
        mul     cx
        mov     di,ax
```

```
        mov     es,ds:[nesting_selector]        ;set es = save area
        mov     si,offset pl0_stack_start       ;point to priv level 0 stack mov     cx,pl0_stack_length/4
        mov     word ptr es:[di].stack_move_start,si
        mov     word ptr es:[di].stack_move_size,cx
        mov     word ptr es:[di].stack_move_offset,0
        add     di,size stack_move_struc rep movsd                               ;save priv level 0 stack
;
;join in here if not copying all of the p.m. stack
;
join_after_stack_copy:
        cmp     cs:using_ems,0
        jne     copy_caller_regs
        add     di,caller_regs_length
        jmp     short dont_copy_caller_regs copy_caller_regs:
        mov     si,offset caller_regs           ;point to caller registers
        mov     cx,caller_regs_length/4
        rep movsd                               ;save caller registers dont_copy_caller_regs:
        mov     cx,8
        mov     si,offset caller_ds_descriptor  ;point to caller descriptors
        rep movsd                               ;save caller descriptors
        mov     ax,ds:instruction_length        ;get instruction length
        stosw                                   ;save instruction length
        mov     ax,ds:[return_offset]
        stosw
        mov     ax,ds:[return_segment]
        stosw
        mov     al,ds:caller_mode               ;save caller mode
        stosb
        mov     eax,esp                         ;get sp
        add     eax,32
        stosd                                   ;save esp
        mov     ax,ss
        stosw
        str     ax
        stosw
        and     byte ptr ds:tss_seg+5,NOT 02    ;clear task busy flag
        ltr     cs:[tss_selector]
        inc     byte ptr ds:task_count          ;add 1 to saved task count ;mov    ax,word ptr ss:[esp+52]                 ;get int flags
        mov     ax,word ptr ss:[esp+84]         ;get int flags
        or      ah,30h                          ;iopl 3
        and     ah,3eh                          ;iopl 3 no trap flag
        mov     word ptr ds:[v86_eflags],ax mov     eax,dword ptr ss:[esp+72]       ;get error_code
;mov    eax,dword ptr ss:[esp+40]                ;get error_code
        mov     ds:[v86_error_code],eax mov     word ptr ds:v86_eflags+2,2      ;set v86 mode flag
        mov     ax,offset stub_prot_return      ;get re-entry offset
```

```
        sub     ax,offset rmstub3               ;relative to stub
        shl     bx,2                            ;task # *4=offset into int 2ds
        add     ax,bx
        mov     word ptr ds:v86_eip,ax          ;store offset in tss
        mov     ax,ds:rm386_cs_value            ;get cs
        mov     ds:v86_cs,ax                    ;store selector in tss
        popad                                   ;restore registers
        pop     es                              ;restore es
        pop     ds                              ;restore ds
        mov     ss,cs:[pmode_data_selector]
        mov     sp,offset v86_error_code        ;set sp as if v86 int
        push    ax
        push    ebx
        push    edi
        mov     ebx,dword ptr ss:v86_error_code ;get error code
        shr     bx,3                            ;get interrupt number
        jmp     general_int_handler_4           ;join handler code
;---------------------------------------------------------------------------
;---------------------------------------------------------------------------
;
; INT 2D: handle re-entry from protected mode interrupt handling
;
        align   4                               ;force 4 byte boundary
        public  int_2D_handler
int_2D_handler:
        push    bx
        mov     bx,2dh*4
        push    ax
        mov     ax,ss
        cmp     ax,cs:[pmode_data_selector]
        jne     @f
        movzx   esp,sp @@:     test    byte ptr ss:[esp+14],2
        jz      reflect_protected_int_entry
        cmp     word ptr ss:v86_cs,1234h        ;called from stub
        org     $-2
v86_chk_2D_value:
        dw      0
        pop     ax
        jne     reflect_int_instruction
        pop     bx protected_int_return:
        cld
        cli
        cmp     byte ptr cs:task_count,0
        je      protected_int_skip
        mov     esp,offset tmpstack             ;get a temp stack
        pushad                                  ;save regs
        mov     ax,ss                           ;get ss
        mov     ds,ax
        mov     es,ax                           ;set es = ss push    word ptr ds:[v86_es]            ;transfer v86 es & ds & flags
        push    word ptr ds:[v86_ds]
        push    word ptr ds:[v86_eflags]
```

```
        mov     ax,word ptr ds:[v86_eip]        ;get offset of int 2d
        add     ax,offset rmstub3               ;adjust relative 0
        sub     ax,offset stub_prot_return+4    ;get re-entry offset
        shr     ax,2                            ;ax now task number
        movzx   eax,ax
        bts     ds:[task_bittbl],eax            ;clear task active bit
        jc      protected_int_skip              ;if was set then error
        mov     cx,task_length
        mul     cx
        mov     si,ax dec     byte ptr ds:task_count          ;update saved task count
        mov     ds,cs:[nesting_selector]        ;set ds = save area sel.
        mov     cx,ds:[si].stack_move_size
        mov     di,ds:[si].stack_move_start
        add     si,ds:[si].stack_move_offset
        add     si,size stack_move_struc rep movsd                               ;restore priv level 0 stack
;
;only copy caller regs if need to
;
        cmp     cs:using_ems,0
        jne     short restore_caller_regs
        add     si,caller_regs_length
        jmp     short dont_restore_caller_regs restore_caller_regs:
        mov     di,offset caller_regs           ;point to caller registers
        mov     cx,caller_regs_length/4
        rep movsd                               ;restore caller registers dont_restore_caller_regs:
        mov     di,offset caller_ds_descriptor  ;point to caller descriptors
        mov     cx,8
        rep movsd                               ;restore caller descriptors
        lodsw                                   ;get saved instruction length
        mov     es:instruction_length,ax        ;restore instruction length
        lodsw
        mov     es:[return_offset],ax
        lodsw
        mov     es:[return_segment],ax
        lodsb
        mov     es:caller_mode,al               ;save caller mode
        lodsd                                   ;get saved sp
        mov     dword ptr es:tmpstksp,eax
        lodsw
        mov     word ptr es:[tmpstksp+4],ax
        lodsw
        movzx   eax,ax
        and     byte ptr es:[eax+global_descriptor_table+5],not 2
        ltr     ax
        pop     ax
        lds     esi,fword ptr es:tmpstksp
        and     ax,3effh                        ;clear nt flag & iopl 0
        test    byte ptr ds:[esi+53],1          ;tf was set?
        je      @f
        or      ah,1                            ;save trap flag
@@:     mov     word ptr ds:[esi+52],ax         ;set flags
        pop     word ptr es:[v86_ds]
```

```
        pop     word ptr es:[v86_es]

popad                                   ;restore regs
        lss     esp,fword ptr es:tmpstksp       ;back to user stack pop     es                              ;restore es
        pop     ds                              ;restore ds
        pop     fs
        pop     gs
        mov     ss:[esp],di
        mov     ss:[esp+4],si
        mov     ss:[esp+8],bp
        mov     ss:[esp+16],bx
        mov     ss:[esp+20],dx
        mov     ss:[esp+24],cx
        mov     ss:[esp+28],ax
        POPAD
        add     sp,4                            ;ignore error code
        iretd                                   ;return to caller general_int_handler_4:
        shl     bx,2                            ;convert to real mode index
        movzx   edi,word ptr ss:v86_ss          ;edi = user ss value
        shl     edi,4                           ;into linear address
        mov     word ptr ss:v86_esp+2,0         ;zero out high order in case
        sub     word ptr ss:v86_esp,6           ;record new stack value
        jc      short no_redirect_2
        add     edi,dword ptr ss:v86_esp        ;stack pointer to di
        mov     ds,ss:big_selector              ;point linear memory ; DS:DI => V86 mode stack pointer mov     ax,word ptr ss:v86_eflags       ;old flags value
        mov     word ptr ds:[edi+4],ax          ;store flags on user stack mov     ax,ss:v86_cs                    ;old cs value
        mov     word ptr ds:[edi+2],ax          ;store cs value on user stack mov     ax,word ptr ss:v86_eip          ;old ip value
        mov     word ptr ds:[edi],ax            ;store updated old ip value ; Calculate new v86 cs:ip mov     ax,word ptr ds:[bx]             ;new ip value from real idt
        mov     word ptr ss:v86_eip,ax          ;into v86 register stack
        mov     ax,word ptr ds:[bx+2]           ;new cs value from real idt
        mov     ss:v86_cs,ax                    ;into v86 register stack pop     edi                             ;restore entry stack
        pop     ebx                             ;ebx
        pop     ax                              ;ax
        add     sp,4                            ;step over return code
        and     word ptr ss:v86_eflags+1,0fefch ;clear TF+IF+RF flags
        iretd                                   ;& return to v86 mode no_redirect_2:
        add     word ptr ss:v86_esp,6
        movzx   edi,word ptr ss:v86_ss          ;edi = user ss value
        shl     edi,4                           ;into linear address
        mov     dword ptr ss:user_data_seg+2,edi;store into descriptor
```

```
        mov     byte ptr ss:user_data_seg+5,92h  ;restore descriptor type
        mov     di,word ptr ss:v86_esp           ;stack pointer to di
        sub     di,2                             ;-2 for first item
        mov     ds,ss:user_data_selector         ;point DS at stack segment ; DS:DI => V86 mode stack pointer mov     ax,word ptr ss:v86_eflags        ;old flags value
        mov     ds:[di],ax                       ;store flags on user stack
        mov     ax,ss:v86_cs                     ;old cs value
        mov     ds:[di-2],ax                     ;store cs value on user stack
        mov     ax,word ptr ss:v86_eip           ;old ip value
        mov     word ptr ds:[di-4],ax            ;store updated old ip value
        sub     di,4
        mov     word ptr ss:v86_esp,di           ;record new stack value
        and     word ptr ss:v86_eflags+1,0fefch  ;clear TF+IF+RF flags ; Calculate new v86 cs:ip mov     ds,ss:real_data_selector         ;ds => linear zero
        mov     ax,word ptr ds:[bx]              ;new ip value from real idt
        mov     word ptr ss:v86_eip,ax           ;into v86 register stack
        mov     ax,word ptr ds:[bx+2]            ;new ip value from real idt
        mov     ss:v86_cs,ax                     ;into v86 register stack pop     edi                              ;restore entry stack
        pop     ebx                              ;ebx
        pop     ax                               ;ax
        add     sp,4                             ;step over return code
        iretd                                    ;& return to v86 mode
```

EXAMPLE OF WINDOWS VXD CODE NEEDED TO TRANSFER CONTROL
BETWEEN A VMM ENVIRONMENT AND A WINDOWS ENVIRONMENT

```
VxD_ICODE_SEG

Set_up_RM386_api:

pushad
        or      edx,edx
        je      no_api_setup sub     edx,size RM386_info_struct      ;now edx points at start of info
        mov     edi,offset32 Cloaking_jmp
        mov     esi,edx
        mov     ecx,cloaking_copy_len
        cld
        rep movsb mov     eax,Cloaking_jmp
        VMMCall _MapPhysToLinear <eax, 4096, 0> ;convert to linear
        mov     Cloaking_jmp,eax
        cmp     byte ptr [eax],0eah             ;check for jmp instruction
        jne     pm_api_error
        mov     ebx,offset32 api_call_entry     ;get old api entry offset
        xchg    [eax+1],ebx
        mov     dword ptr ds:[old_api_jmp],ebx mov     bx,cs
        xchg    [eax+5],bx                      ;get old api segment
        mov     word ptr ds:[old_api_jmp+4],bx  ;save locally mov     eax,CB_table_addr
        VMMCall _MapPhysToLinear <eax, 4096, 0> ;convert to linear
        mov     CB_table_addr,eax
        popad
        pushad
        sub     edx,size RM386_info_struct      ;now edx points at start of info
;
;get rm api gdt info
;
        mov     ax,word ptr [edx.RM_1st_api_sel] ;get first selector number
        mov     apistart,ax
        mov     apinext,ax
        mov     ax,[edx.GDT_sel_count]          ;get first selector number
        mov     gdt_count,ax
        mov     gdt_loop_count,ax
        mov     eax,[edx.RMapi_GDT_addr]        ;physical address of gdt
        push    edx
        VMMCall _MapPhysToLinear <eax, 4096, 0> ;convert to linear
        pop     edx
        mov     RM_GDT,eax                      ;save
;
;copy passalong api address to ax
;
        mov     eax,dword ptr [edx.StubPassalong] ;get offset of passalong
        mov     dword ptr pass_along,eax
        mov     ax,word ptr [edx.stubPassalong+4]
        mov     word ptr pass_along+4,ax
```

```
;
;now try to allocate all the gdt selectors needed
;
        mov     edx,-1                          ;marker
        push    edx                             ;save marker on stack allocate_b4_first:
        VMMCall _BuildDescriptorDwords <eax, 0ffffh, 9bh, 00h, BDDExplicitDPL>

VMMCall _Allocate_GDT_Selector <edx, eax, 0>
        mov     ecx,eax
        or      ecx,edx
        jz      pm_api_error and     ax,not 07h
        cmp     ax,apistart
        je      short next_2_use
        ja      pm_api_error
        push    eax
        jmp     allocate_b4_first
;
;now set up matching GDT selectors for RM's api
;
next_2_use:
        cmp     ax,apinext                      ;is this the correct next select
        jne     pm_api_error
        movzx   eax,ax                          ;clear high order
        push    eax                             ; gets popped only if used
        add     eax,RM_GDT
;
;get base of rm386 selector
;
        mov     bl,byte ptr ds:[eax].segd_address+2
        mov     bh,byte ptr ds:[eax].segd_address_hi
        shl     ebx,16
        mov     bx,word ptr ds:[eax].segd_address
        cmp     ebx,4*1024*1024                 ;past linear mapping point?
        jb      short @f
        sub     ebx,4*1024*1024                 ;adjust for rm displacement
        push    eax
        VMMCall _MapPhysToLinear <ebx, 4096, 0> ;convert to linear
        mov     ebx,eax                         ;"non mapped"
        pop     eax
;
;get limit of rm386 selector
;
@@:     mov     cl,byte ptr ds:[eax].segd_hilim
        and     cl,0fh
        xor     ch,ch
        shl     ecx,16
        mov     cx,word ptr ds:[eax].segd_limit
;
;get descriptor type, dpl, granularity, etc...
;
        jecxz   selector_not_in_use             ;limit of 0 invalid--not used
                                                ; selector popped off at free_ne
        mov     bp,word ptr ds:[eax].segd_hilim
        and     bp,0f0h                         ;keep high 4 of DESCSize byte
        mov     dl,byte ptr ds:[eax].segd_access
        movzx   edx,dl
```

```
                movzx   ebp,bp

VMMCall _BuildDescriptorDwords <ebx, ecx, edx, ebp, BDDExplicitDPL> pop     ecx                             ;get back selector
                VMMCall _SetDescriptor <ecx, 0, edx, eax, 0>
selector_not_in_use:
                add     apinext,8
                dec     gdt_loop_count
                jz      short free_next_entry VMMCall _BuildDescriptorDwords <eax, 0ffffh, 9bh, 00h, BDDExplicitDPL>

VMMCall _Allocate_GDT_Selector <edx, eax, 0>
                mov     ecx,eax
                or      ecx,edx
                jz      pm_api_error
                jmp     next_2_use
;
;now free the intermediate gdt selectors we alloc'd before
;
free_next_entry:
                pop     eax                             ;get back selector
                cmp     eax,-1                          ;end of selectors?
                je      short gdt_complete
                VMMCall _Free_GDT_Selector <eax, 0>
                or      eax,eax
                jz      pm_api_error
                jmp     short free_next_entry
;
;ok, done building GDT table, grab selectors to doll out at run time
;
gdt_complete:
                xor     edi,edi
                mov     ecx,NUM_SELECTORS grab_gdt_entries:
                push    ecx
                push    edi
                xor     eax,eax
                VMMCall _BuildDescriptorDwords <eax, 0ffffh, 9bh, 00h, BDDExplicitDPL>

VMMCall _Allocate_GDT_Selector <edx, eax, 0>
                mov     ebx,eax
                or      ebx,edx
                pop     edi
                pop     ecx
                jz      pm_api_error
                mov     word ptr ds:[edi].selector_id,ax ;save selector in table
                add     di,2
                loop    grab_gdt_entries                ;go get another gdt selector
;
;now grab int 2c broadcast PM and V86
;
                sidt    winidt                          ;get idt pointer
                mov     esi,dword ptr ds:[winidt+2]     ;get address of idt
                mov     eax,dword ptr [esi+2ch*8]       ;get lo word of int 2c handler
                mov     edx,dword ptr [esi+2ch*8+4]     ;get hi word of int 2c handler
                mov     dx,ax                           ;set address
```

```
        shr     eax,16
        mov     dword ptr [oldi2c],edx          ;save previous handler
        mov     word ptr [oldi2c+4],ax          ;selector of old handler
        mov     edx,offset32 vxd_int_2c_handler
        mov     ax,cs
        shl     eax,16                          ;move selector to high order
        mov     ax,dx
        mov     dx,0ee00h                       ;interrupt gate type dpl=3
        mov     dword ptr [esi+2ch*8],eax       ;set new vector
        mov     dword ptr [esi+2ch*8+4],edx
        mov     word ptr WinDS,ds
;
;allocate the cb area that we need for saving the v86 cs:eip and ss:esp
;
        mov     eax,size CB_SPECIAL
        VMMCall _Allocate_Device_CB_Area <eax, 0>
        or      eax,eax
        jz      pm_api_error
        mov     cb_special_pointer,eax mov     eax,2ch
        mov     esi,offset32 Pass_along_handler
        VMMCall Hook_V86_Int_Chain
        jc      pm_api_error
```

EXAMPLE OF VMM API SERVICES

INCLUDING STARTUP OF PROTECTED MODE DRIVER CODE

```
;
;       structure of a segment descriptor
;
segd                struc           ;data segment descriptor
segd_limit          dw    0         ;segment limit (length)
segd_address        db    3 dup (?) ;24 bit physical address
segd_access         db    0         ;access rights byte
segd_hilim          db    0         ;high order limit on 386
segd_address_hi     db    0         ;8 high order address bits
segd                ends ;
;       v86 client registers at time of int 2c
;
Client_Reg_Struc    struc
Client_EDI          dd    ?
Client_ESI          dd    ?
Client_EBP          dd    ?
                    dd    ?
Client_EBX          dd    ?
Client_EDX          dd    ?
Client_ECX          dd    ?
Client_EAX          dd    ?
Client_Error        dd    ?
Client_EIP          dd    ?
Client_CS           dw    ?
                    dw    ?
Client_EFlags       dd    ?
Client_ESP          dd    ?
Client_SS           dw    ?
                    dw    ?
Client_ES           dw    ?
                    dw    ?
Client_DS           dw    ?
                    dw    ?
Client_FS           dw    ?
                    dw    ?
Client_GS           dw    ?
                    dw    ?
Client_Reg_Struc ends
;-----------------------------------------------------------------------
;                       data area for api processor
;-----------------------------------------------------------------------
;
        public  passalong_offset,passalong_segment
;
farcall             dw    0,0
farcallseg          dw    0
;
passalong_offset dd       offset api_passalong_head+110000H
passalong_segment dw      flat_code_equ

;
;***********************************************************************
```

```
;                               C O D E
;*****************************************************************************
;

;-----------------------------------------------------------------------------
;Transition to protected code loaded at xms handle
;
;
;       Entry:  DX = XMS handle of block containing code
;               CL = 0 for 16 bit code, non zero for 32 bit code
;
;       Exit:   AX = 0 failure
;                    1 success
;                    BL = 0A2h invalid handle
;                    BL = 0B0h out of GDT selectors
;
;       protected mode routine at offset 0 in XMS block is called
;       with registers as follows:
;
;               EBX     physical address of start of block
;               CS      code selector for XMS block as 4G starts at EBX
;               DS      data selector for XMS block as 4G starts at EBX
;               ES      selector for V86 memory acess to full 1 mb
;               GS      selector for memory mapped flat
;               ESI     as user defines
;               EDI     as user defines
;
;-----------------------------------------------------------------------------
              public   cloaking_api_startup cloaking_api_startup proc near
              pushad
              cli
              mov      ds,cs:[pmode_data_selector]
              push     esi
              push     edi
              mov      caller_bx,bx                    ;set up values
              cmp      dx,number_of_handles
              ja       api_handle_error
              bt       xms_handle_flags,dx
              jnc      api_handle_error
              mov      di,dx
              shl      di,3
              add      di,address_of_xms_handle_struc  ;point at structure mov      edx,[di].xms_size               ;assume max limit
              shl      edx,10                          ;convert to bytes
              or       cl,cl
              jz       @f
              shr      edx,12                          ;/4K granular seg size
              or       edx,edx
              jnz      @f
              inc      dx @@:           call     alloc_gdt_selector
              jnc      @f vmac_no_selectors:
              mov      byte ptr caller_bx,0b0h
```

```
                mov     caller_ax,0
                jmp     api_error_exit          ;out of selectors @@:             movzx   esi,ax                  ;clear high_order
                mov     ebx,[di].xms_page       ;get physical addr of mem
                shl     ebx,10                  ;now got linear addr of mem add     ebx,4*1024*1024         ;adjust to linear page table
                call    set_selector_base
                sub     ebx,4*1024*1024         ;adjust to linear page table
                mov     global_descriptor_table[esi].segd_access,9ah
                and     global_descriptor_table[esi].segd_hilim,0fh
                or      cl,cl                   ;if cl =0 then 16 bit code
                je      @f
                or      global_descriptor_table[esi].segd_hilim,0c0h ;16 bit, 4Gb @@:             push    ax
                call    alloc_gdt_selector      ;get a selector for data access
                jnc     @f
                pop     si
                call    free_gdt_selector       ;free the code selector
                jmp     short vmac_no_selectors ;error exit @@:             movzx   esi,ax                  ;clear high_order
                add     ebx,4*1024*1024         ;adjust to linear page table
                call    set_selector_base
                sub     ebx,4*1024*1024         ;adjust to linear page table
                mov     global_descriptor_table[esi].segd_access,92h
                ;mov    global_descriptor_table[esi].segd_hilim,0
                and     global_descriptor_table[esi].segd_hilim,0fh
                or      cl,cl                   ;16 bit?
                je      @f
                mov     global_descriptor_table[esi].segd_hilim,0c0h @@:             mov     ds,ax
                pop     ax                      ;get back code selector
                mov     es,ss:Big_selector
                mov     gs,ss:flat_selector
                mov     dx,cs
                mov     ss:[farcallseg],ax      ;set segment for call
                xor     eax,eax
                mov     ax,offset cs:pm_api_entry
                pop     edi
                pop     esi
                call    fword ptr ss:[farcall]  ;call user routine
api_error_exit:
                popad
                ret api_handle_error:
                mov     byte ptr caller_bx,0a2h
                mov     caller_ax,0
                jmp     api_error_exit          ;invalid xms handle
cloaking_api_startup endp ;---------------------------------------------------------------------------
;allocate a gdt selector
;
;       Entry:  EBX = selector base
```

```
;                   EDX = selector limit
;                   CL = selector access
;                   CH = selector mode
;
;
;       Exit:   if no carry
;                   AX = selector to use
;               if carry
;                   AX = 1 -- out of selectors
;
;------------------------------------------------------------------------
            public  alloc_gdt_selector alloc_gdt_selector proc near
            push    si
            push    ds
            push    cx
            mov     ds,cs:pmode_data_selector xor     si,si                               ;point at flags
            mov     cx,Num_GDT_spares                   ;spare count ags_search:
            cmp     byte ptr ds:GDT_alloc_flags[si],0   ;in use?
            je      ags_found_one                       ;0=no
            inc     si
            loop    ags_search                          ;next
            stc
            mov     ax,1h                               ;invalid selector value
            pop     cx
            pop     ds
            pop     si
            ret ags_found_one:
            pop     cx
            push    cx
            mov     byte ptr ds:GDT_alloc_flags[si],1   ;in use!
            shl     si,3                                ;convert to selector
            add     si,ds:GDT_spares_start              ;
            push    ebx
            push    edx
            mov     ax,bx
            shr     ebx,16                              ;move high part low
            mov     word ptr ds:global_descriptor_table[si].segd_address,ax
            mov     byte ptr ds:global_descriptor_table[si].segd_address+2,bl
            mov     byte ptr ds:global_descriptor_table[si].segd_address_hi,bh
            mov     ds:global_descriptor_table[si].segd_access,cl
            and     ch,0f0h
            mov     byte ptr ds:global_descriptor_table[si].segd_hilim,ch
            mov     word ptr ds:global_descriptor_table[si].segd_limit,DX
            shr     edx,16
            and     dl,0fh
            or      byte ptr ds:global_descriptor_table[si].segd_hilim,dl
            pop     edx
            pop     ebx
            mov     ax,si
            pop     cx
            pop     ds
            pop     si
```

```
        clc
        ret
alloc_gdt_selector endp

;------------------------------------------------------------------------
;Free GDT selector
;
;       Entry:  SI = selector
;
;       Exit:   if no carry
;                       completed ok
;               if carry
;                       AX = 2 -- Invalid selector
;                          = 3 -- Selector not user selector
;                          = 4 -- Selector not allocated
;
;------------------------------------------------------------------------
        public  free_GDT_selector
free_GDT_selector proc near
        call    validate_selector
        jnc     @f
        ret @@:     push    si
        push    ds
        mov     ds,cs:pmode_data_selector
        sub     si,ds:GDT_spares_start          ;
        shr     si,3                            ;convert to byte offset
        mov     byte ptr ds:GDT_alloc_flags[si],0  ;in use?
        pop     ds
        pop     si
        clc
        ret
free_GDT_selector endp ;------------------------------------------------------------------------
;Set selector base
;
;       Entry:  SI = selector
;               EBX = physical start address
;
;       Exit:   if no carry
;                       completed ok
;               if carry
;                       AX = 2 -- Invalid selector
;                          = 3 -- Selector not user selector
;                          = 4 -- Selector not allocated
;
;------------------------------------------------------------------------
set_selector_base proc near
        call    validate_selector               ;see if valid user selector
        jnc     @f
        ret @@:     push    ax
        push    ebx
        push    ds
        mov     ds,cs:pmode_data_selector
        mov     ax,bx
        shr     ebx,16                          ;move high part low
```

```asm
            mov     word ptr ds:global_descriptor_table[si].segd_address,ax
            mov     byte ptr ds:global_descriptor_table[si].segd_address+2,bl
            mov     byte ptr ds:global_descriptor_table[si].segd_address_hi,bh
            pop     ds
            pop     ebx
            pop     ax
            clc
            ret
set_selector_base endp ;-----------------------------------------------------------------------------
;Set selector access
;
;       Entry:  SI = selector
;               CL = R/W access bits for segment
;
;       Exit:   if no carry
;                       completed ok
;               if carry
;                       AX = 2 -- Invalid selector
;                          = 3 -- Selector not user selector
;                          = 4 -- Selector not allocated
;
;-----------------------------------------------------------------------------
set_selector_access proc near
            call    validate_selector           ;see if valid user selector
            jnc     @f
            ret @@:         push    ds
            mov     ds,cs:pmode_data_selector
            mov     ds:global_descriptor_table[si].segd_access,cl
            pop     ds
            clc
            ret
set_selector_access endp ;-----------------------------------------------------------------------------
;Set selector mode
;
;       Entry:  SI = selector
;               CL = granularity
;
;       Exit:   if no carry
;                       completed ok
;               if carry
;                       AX = 2 -- Invalid selector
;                          = 3 -- Selector not user selector
;                          = 4 -- Selector not allocated
;
;-----------------------------------------------------------------------------
set_selector_mode proc near
            call    validate_selector           ;see if valid user selector
            jnc     @f
            ret @@:         push    ds
            mov     ds,cs:pmode_data_selector
            and     cl,0f0h                     ;keep only high order bits
            and     byte ptr ds:global_descriptor_table[si].segd_hilim,0fh
```

```
                or      byte ptr ds:global_descriptor_table[si].segd_hilim,cl
                pop     ds
                clc
                ret
set_selector_mode endp ;------------------------------------------------------------------------------
;Set selector limit
;
;       Entry:  SI = selector
;               EBX = limit
;
;       Exit:   if no carry
;                       completed ok
;               if carry
;                       AX = 2 -- Invalid selector
;                          = 3 -- Selector not user selector
;                          = 4 -- Selector not allocated
;
;------------------------------------------------------------------------------
set_selector_limit proc near
                call    validate_selector               ;see if valid user selector
                jnc     @f
                ret @@:             push    ax
                push    ebx
                push    ds
                mov     ds,cs:pmode_data_selector
                mov     ax,bx
                shr     ebx,16                          ;move high part low
                mov     word ptr ds:global_descriptor_table[si].segd_limit,ax
                and     bl,0fh
                and     byte ptr ds:global_descriptor_table[si].segd_hilim,0f0h
                or      byte ptr ds:global_descriptor_table[si].segd_hilim,bl
                pop     ds
                pop     ebx
                pop     ax
                clc
                ret
set_selector_limit endp ;------------------------------------------------------------------------------
;validate_selector
;
;       Entry:  SI = selector
;
;       Exit:   if no carry
;                       completed ok
;               if carry
;                       AX = 2 -- Invalid selector
;                          = 3 -- Selector not user selector
;                          = 4 -- Selector not allocated
;
;------------------------------------------------------------------------------
validate_selector proc near
                push    si
                push    ax
                push    ds
                mov     ds,cs:pmode_data_selector
```

```
                test    si,7                            ;bits should be clear
                jz      @f
                mov     ax,2 vs_error_ret:
                pop     ds
                pop     si
                pop     si
                stc
                ret @@:             sub     si,ds:GDT_spares_start          ;see if in range
                jae     @f vs_inv_sel:
                mov     ax,3
                jmp     short vs_error_ret @@:             shr     si,3                            ;convert to byte offset
                cmp     si,Num_GDT_spares               ;in range?
                jae     short vs_inv_sel
                cmp     byte ptr ds:GDT_alloc_flags[si],0   ;in use?
                jne     @f
                mov     ax,4
                jmp     short vs_error_ret @@:             pop     ds
                pop     ax
                pop     si
                clc
                ret
validate_selector endp ;---------------------------------------------------------------------------
;get IDT entry -- return selctor:offset of an IDT vector
;
;       Entry:  CL = Int number
;
;       Exit:   DX:EBX current far call address
;
;---------------------------------------------------------------------------
get_IDT_entry proc near
                push    eax
                movzx   eax,cl
                shl     eax,3
                mov     ebx,cs:interrupt_descriptor_table[eax]+4
                mov     eax,cs:interrupt_descriptor_table[eax]
                mov     bx,ax
                shr     eax,16
                mov     dx,ax
                pop     eax
                clc
                ret
get_IDT_entry endp ;---------------------------------------------------------------------------
;set IDT entry -- set an IDT vector to selctor:offset
;
;       Entry:  CL = Int number
;
```

```
;       Exit:   DX:EBX current far call address
;
;-------------------------------------------------------------------------
set_IDT_entry proc near
        push    eax
        push    ebx
        push    ecx
        push    ds
        mov     ds,cs:pmode_data_selector
        movzx   eax,cl
        shl     eax,3
        mov     word ptr ds:interrupt_descriptor_table[eax],bx
        mov     word ptr ds:interrupt_descriptor_table[eax]+2,dx
        shr     ebx,16
        mov     word ptr ds:interrupt_descriptor_table[eax]+6,bx
;
;if pentium set trap bit in tss int map
;
        test    global_flags_5,pentium_support
        jz      sie_no_pent
        movzx   ebx,word ptr ds:[tss_offset]
        movzx   eax,cl
        bts     ds:[ebx+tss_int_map],eax sie_no_pent:
        pop     ds
        pop     ecx
        pop     ebx
        pop     eax
        clc
        ret
set_IDT_entry endp ;-------------------------------------------------------------------------
;get_passalong -- return current value of PM pass-along api
;
;       Entry:  none
;
;       Exit:   DX:EBX current far call address
;
;-------------------------------------------------------------------------
get_passalong proc near
        mov     dx,cs:passalong_segment
        mov     ebx,cs:passalong_offset
        clc
        ret
get_passalong endp ;-------------------------------------------------------------------------
;set_passalong -- set PM pass-along api address (will be far called on int 2f
;                 from v86 mode with ax = ef57)
;
;       Entry:  DX:EBX current far call address
;
;       Exit:   none
;
;-------------------------------------------------------------------------
set_passalong proc near
        push    ds
        mov     ds,cs:pmode_data_selector
```

```
            mov     ds:passalong_segment,dx
            mov     ds:passalong_offset,ebx
            pop     ds
            clc
            ret
set_passalong endp ;----------------------------------------------------------------
;get selector limit
;
;       Entry:  SI = selector
;
;       Exit:   if no carry
;                       EBX = limit
;                       completed ok
;               if carry
;                       AX = 2 -- Invalid selector
;                          = 3 -- Selector not user selector
;                          = 4 -- Selector not allocated
;
;----------------------------------------------------------------
get_selector_limit proc near
            call    validate_selector           ;see if valid user selector
            jnc     @f
            ret @@:         push    ax
            push    ds
            mov     ds,cs:pmode_data_selector
            mov     bl,byte ptr ds:global_descriptor_table[si].segd_hilim
            and     bl,0fh
            xor     bh,bh
            shl     ebx,16
            mov     bx,word ptr ds:global_descriptor_table[si].segd_limit
            pop     ds
            pop     ax
            clc
            ret
get_selector_limit endp ;----------------------------------------------------------------
;get selector base
;
;       Entry:  SI = selector
;
;
;       Exit:   if no carry
;                       EBX = linear start address
;                       completed ok
;               if carry
;                       AX = 2 -- Invalid selector
;                          = 3 -- Selector not user selector
;                          = 4 -- Selector not allocated
;
;----------------------------------------------------------------
get_selector_base proc near
            call    validate_selector           ;see if valid user selector
            jnc     @f
            ret
```

```
@@:     push    ds
        mov     ds,cs:pmode_data_selector
        mov     bl,byte ptr ds:global_descriptor_table[si].segd_address+2
        mov     bh,byte ptr ds:global_descriptor_table[si].segd_address_hi
        shl     ebx,16
        mov     bx,word ptr ds:global_descriptor_table[si].segd_address
        pop     ds
        clc
        ret
get_selector_base endp ;-----------------------------------------------------------------------
;undefined function error returner
;-----------------------------------------------------------------------
invalid_fun proc near
        xor     eax,eax
        stc
        ret
invalid_fun endp ;-----------------------------------------------------------------------
;call v86 mode proc -- call a procedure running in v86 mode
;                      procedure returns with a retf
;
;       Entry:  ds:ebx = client register structure for v86 mode call
;               note: uses v86 mode stack currently set
;               client_cs and ip are address of routine to far call
;
;       Exit:   cy set = no more nested procedure call space available
;
;-----------------------------------------------------------------------
call_v86_proc proc near
        cmp     byte ptr cs:task_count,task_max
        jb      @f
        stc
        ret @@:     cli
        pushad
        push    dword ptr cs:[v86_eflags]
        push    cs:[v86_es]
        push    cs:[v86_ds]
        push    ds
        push    ebx                             ;save ebp for return
        pushfd
        push    0
        push    cs
        push    0
        push    offset v86_call_ret_point
        push    dword ptr 0                     ;bogus error_code pushad                                  ;hi-order regs for v86 code
        push    gs
        push    fs
        push    ds                              ;save ds
        push    es                              ;save es
        mov     ax,1                            ;build far return frame
        call    save_nested_state
```

```
            mov     ax,ds:[ebx].Client_cs           ;now set exec point for v86
            mov     es:[v86_cs],ax
            mov     ax,word ptr ds:[ebx].Client_eip ;
            mov     word ptr es:[v86_eip],ax mov     eax,ds:[ebx].Client_eax         ;now set up registers
            mov     ecx,ds:[ebx].Client_ecx
            mov     edx,ds:[ebx].Client_edx
            mov     edi,ds:[ebx].Client_edi
            mov     esi,ds:[ebx].Client_esi
            mov     ebp,ds:[ebx].Client_ebp
            mov     ebx,ds:[ebx].Client_ebx
            push    es
            pop     ss
            mov     esp,offset v86_eip
            iretd v86_call_ret_point:
            push    ebx
            mov     ebx,esp
            mov     ds,ss:[ebx+8]
            mov     ebx,ss:[ebx+4]                  ;get back old ebp
            mov     ds:[ebx].Client_eax,eax         ;now pass back registers
            mov     ds:[ebx].Client_ecx,ecx
            mov     ds:[ebx].Client_edx,edx
            mov     ds:[ebx].Client_edi,edi
            mov     ds:[ebx].Client_esi,esi
            mov     ds:[ebx].Client_ebp,ebp
            mov     eax,ss:[esp]
            mov     ds:[ebx].Client_ebx,eax
            mov     es,cs:[pmode_data_selector]     ;get ss
            mov     ax,es:[v86_es]
            mov     ds:[ebx].Client_es,ax
            mov     ax,es:[v86_ds]
            mov     ds:[ebx].Client_ds,ax
            pushf
            pop     ax
            mov     word ptr ds:[ebx].Client_eflags,ax
            pop     ebx
            pop     ebx
            pop     ds
            mov     es,cs:pmode_data_selector
            pop     es:[v86_ds]
            pop     es:[v86_es]
            pop     dword ptr es:[v86_eflags]
            popad
            clc                                     ;no error
            ret
call_v86_proc endp ;----------------------------------------------------------------------
;call v86 mode int -- call an interrupt routine running in v86 mode
;
;       Entry:  ds:ebx = client register structure for v86 mode call
;               cx = interrupt number
;               note: uses v86 mode stack supplied in client structure
;
;       Exit:   cy set = no more nested procedure call space available
;
```

```
;-------------------------------------------------------------------
call_v86_int proc near
        cmp     byte ptr cs:task_count,task_max
        jb      @f
        stc
        ret @@:     cli
        pushad
        push    dword ptr cs:[v86_eflags]
        push    cs:[v86_es]
        push    cs:[v86_ds]
        push    ds
        push    ebx                             ;save ebp for return
        pushfd
        push    0
        push    cs
        push    0
        push    offset v86_call_ret_point
        push    dword ptr 0                     ;bogus error_code pushad
        push    gs
        push    fs
        push    ds                              ;save ds
        push    es                              ;save es
        mov     ax,2                            ;build iret frame
        call    save_nested_state push    ds
        mov     ds,es:big_selector              ;point linear memory
        movzx   ecx,cl
        mov     ax,word ptr ds:[ecx*4]
        mov     word ptr es:[v86_eip],ax
        mov     ax,word ptr ds:[ecx*4+2]
        mov     es:[v86_cs],ax
        pop     ds mov     eax,ds:[ebx].Client_eax         ;now set up registers
        mov     ecx,ds:[ebx].Client_ecx
        mov     edx,ds:[ebx].Client_edx
        mov     edi,ds:[ebx].Client_edi
        mov     esi,ds:[ebx].Client_esi
        mov     ebp,ds:[ebx].Client_ebp
        mov     ebx,ds:[ebx].Client_ebx
        push    es
        pop     ss
        mov     esp,offset v86_eip
        iretd
call_v86_int endp ;-------------------------------------------------------------------
;chain to v86 mode int -- call an interrupt routine running in v86 mode
;
;       Entry:  ds:ebx = client register structure for v86 mode call
;               client_cs and ip are address of interrupt routine
;               note: uses v86 mode stack supplied in client structure
;
;       Exit:   cy set = no more nested procedure call space available
;
```

```
;--------------------------------------------------------------------------
chain_to_v86_int proc near
        cmp     byte ptr cs:task_count,task_max
        jb      @f
        stc
        ret @@:     cli
        pushad
        push    dword ptr cs:[v86_eflags]
        push    cs:[v86_es]
        push    cs:[v86_ds]
        push    ds
        push    ebx                             ;save ebp for return
        pushfd
        push    0
        push    cs
        push    0
        push    offset v86_call_ret_point
        push    dword ptr 0                     ;bogus error_code pushad
        push    gs
        push    fs
        push    ds                              ;save ds
        push    es                              ;save es
        mov     ax,2                            ;build iret frame
        call    save_nested_state mov     ax,ds:[ebx].Client_cs
        mov     es:[v86_cs],ax
        mov     eax,ds:[ebx].Client_eip
        mov     es:[v86_eip],eax mov     eax,ds:[ebx].Client_eax         ;now set up registers
        mov     ecx,ds:[ebx].Client_ecx
        mov     edx,ds:[ebx].Client_edx
        mov     edi,ds:[ebx].Client_edi
        mov     esi,ds:[ebx].Client_esi
        mov     ebp,ds:[ebx].Client_ebp
        mov     ebx,ds:[ebx].Client_ebx
        push    es
        pop     ss
        mov     esp,offset v86_eip
        iretd
chain_to_v86_int endp ;--------------------------------------------------------------------------
;return_callin_address -- return the address of callin api
;
;       entry:  none
;
;       exit:   DX:EBX = address of callin entry point
;--------------------------------------------------------------------------
return_callin_address proc near
        mov     dx,cs:[flat_code_selector]
        mov     bx,offset api_far_call_jmp
        movzx   ebx,bx
        add     ebx,cs:[rm386_linear_base]
        ret
```

```
return_callin_address endp public  api_far_call_jmp
api_far_call_jmp:
        db      0eah
        dw      offset pm_api_jmp,0
        dw      20h                             ;rm386 selector api_passalong_head:
        clc
        retf ;-------------------------------------------------------------------------
;-------------------------------------------------------------------------
;       CLOAKING INSTALLATION CHECK, AND V86 MODE REGISTRATION INFO
;-------------------------------------------------------------------------
;-------------------------------------------------------------------------

;-------------------------------------------------------------------------
;cloaking install check -- return cloaking version info
;                       (XMS function 7F)
;
;       entry:  none
;
;       exit:   AX = 0 if cloaking not available
;               AX = 1 if cloaking available
;                       BX=Cloaking version
;                       CX=Cloaking flags
;                               1=CLOAKING.EXE style device
;                       DS:DX=Cloaking Host Id string (11 chars)
;-------------------------------------------------------------------------
        public cloaking_install_check
cloaking_install_check proc near
        mov     caller_ax,1                     ;return success
        mov     caller_bx,101h                  ;return cloaking version
        mov     caller_cx,0                     ;return cloaking flags
        mov     ax,cs:[rm3stub_segment]         ;return oem id
        mov     ss:[caller_ds],ax
        mov     ax,offset stub_cloaking_id
        sub     ax,offset rm3stub3
        mov     caller_dx,ax
        clc
        ret
cloaking_install_check endp ;-------------------------------------------------------------------------
;-------------------------------------------------------------------------
api_dispatch_table label word
        dw      offset alloc_GDT_selector       ;0
        dw      offset free_GDT_selector        ;1
        dw      offset set_selector_base        ;2
        dw      offset set_selector_limit       ;3
        dw      offset set_selector_access      ;4
        dw      offset set_selector_mode        ;5
        dw      offset get_IDT_entry            ;6
        dw      offset set_IDT_entry            ;7
        dw      offset get_passalong            ;8
        dw      offset set_passalong            ;9
        dw      offset get_selector_base        ;a
```

```
        dw      offset get_selector_limit        ;b
                         get
        dw      17 dup(offset invalid_fun)       ;c-1f reserved for windows
        dw      offset call_v86_proc             ;25h
        dw      offset call_v86_int              ;26h
        dw      offset chain_to_v86_int          ;27h MAX_PM_API_FUN EQU ($-api_dispatch_table)/2

;----------------------------------------------------------------------
;P.M. api interface dispatch routine
;
;       Entry:  EAX = function number
;               other regs as needed
;
;       Exit:   if no carry
;                       completed ok
;               if carry
;                       AX = api error number
;
;       API function number list
;               0       allocate GDT selector
;               1       free GDT selector
;               2       set GDT selector base
;               3       set GDT selector limit
;               4       set GDT selector access rights
;               5       set GDT selector granularity/data mode bits
;               6       get IDT entry (0 to 7F)
;               7       set IDT entry (0 to 7F)
;               8       get PM passalong address
;               9       set PM passalong address
;               0ah     get GDT selector base
;               0bh     get GDT selector limit
;
;               0ch - 1fh reserved for windows vxd extended api
;
;               20h     get ps buffer size
;               21h     save protected state
;               22h     restore protected state
;               23h     issue protected xms
;               24h     set v86 ss:esp stack frame
;               25h     Call V86 mode procedure
;               26h     Call V86 mode int handler
;               27h     Call to a V86 mode int handler
;
;
;       error codes
;               1 -- out of selectors
;               2 -- Invalid selector
;               3 -- Selector not user selector
;               4 -- Selector not allocated
;               5 -- Invalid function number
;
;----------------------------------------------------------------------
        public  pm_api_entry pm_api_entry proc far   ;(ENTRY FOR 16 BIT PROGRAMS)
        add     esp,4
pm_api_jmp:
        movzx   eax,ax                           ;clear high order
```

```
            cmp         eax,MAX_PM_API_FUN              ;past end
            ja          pm_api_error
            call        cs:api_dispatch_table[eax*2]

pushf
            test        byte ptr ss:[esp+11],2          ;were ints on?
            jz          @f
            or          byte ptr ss:[esp+1],2

@@:         popf
            DB          67H,66H                         ;32 BIT OVERRIDE FOR RETURN ret         4 pm_api_error:
            mov         ax,5                            ;invalid function
            stc
            DB          67H,66H                         ;32 BIT OVERRIDE FOR RETURN
            ret         4
pm_api_entry endp
;
code        ends end
```

I claim:

1. A virtual memory monitor (VMM) having a GDT and IDT and which operates in V86 and protected modes for operating protected mode device drivers under a non-protected mode operating system in a computer system, comprising:

interface means coupled to the computer system for detecting the presence of the virtual memory monitor by the device drivers;

means for allocating and de-allocating selectors from the GDT wherein selectors are allocated at a chosen distance from the start of the GDT or in a top-down order from an end of the GDT;

means for setting a base, a limit, a type and an access type parameters for said selectors;

means for trapping the IDT;

means for allowing a V86 mode driver to switch from V86 mode code to protected mode code previously loaded by the driver into extended memory of a V86 mode program whereby said protected mode code is initialized and executed on the same GDT and IDT as the VMM;

means for allowing said protected mode code to return to the V86 mode for continuation of operation of DOS programs;

means for allowing protected mode programs to manipulate registers of the V86 mode execution shown by providing access to a memory location having said registers;

means for allowing interrupts from or in protected mode operations to be reflected in a nested manner to V86 mode;

means for protecting high order registers of said protected mode code by maintaining values of said high order registers in memory and restoring said registers at a completion of an interrupt procedure; and means for allocating selectors from a user selectable starting point.

2. A method for transferring control between a first protected mode environment and another protected mode environment in a personal computer system including system memory, consisting of the steps of:

a) creating a first VMM comprising a control program having a GDT in which protected mode client programs are able to execute with their protected mode selectors defined on the GDT of the VMM and offset from the start of the GDT by a user definable or fixed value, or in a top-down fashion;

b) designating a fixed or known location in the computer system memory through which the location of the GDT for said first VMM environment can be determined;

c) creating in said second VMM environment a driver in accordance with the requirements of said second environment to allocate available selectors in said second environment whereby all selectors defined in environment 1 are allocated to said driver;

d) reading the values of the selectors from memory areas of said first environment by said device driver;

e) translating the values of said selectors into corresponding values that address the same physical memory in said second environment by said device driver;

f) establishing said translated values into selectors of a corresponding offset in the GDT of said second environment by said device driver;

g) having said device driver allocate to itself resources to provide the same API services available in said first environment to said second environment; and h) notifying client programs by said device driver that an environment transition has taken place, and providing the client programs an opportunity to adjust their execution as needed.

3. An improved method for transferring control between Virtual 8086 mode code executing under a VMM and protected mode code in the same environment, consisting of:

a) creating a routine in the VMM that intercepts the execution of an INT instruction in a client program by placing the address of the routine in a IDT;

b) determining whether the execution of said routine was initiated from V86 mode by examining the status of a VM bit in a EFLAGS on a received stack frame;

c) transferring said routine to V86 execution if said bit indicates the INT instruction originated in V86 mode, otherwise performing a subroutine of the following steps if the status of said bit indicates the INT instruction originated in V86 mode;

d) saving all registers by said routine in a memory location;

e) loading by said routine a specified general register with an address of a save area of V86 mode general registers; and f) transferring control by said routine from VMM to an address identified by a memory pointer.

4. The method of claim 3 whereby another routine may intercept the execution of a V86 mode execution code, comprising the following additional steps:

a) obtaining by said another routine the value of the pointer defined in step f using a provided API;

b) setting by said another routine the value of the pointer so that the pointer contains the address of said another routine;

c) examining by said another routine the value of the V86 mode general registers pointed to by the general register defined in order to determine if any action is needed; and d) completing execution by said another routine by transferring control to the address gotten in step a, or by returning control back to a calling routine.

* * * * *